(12) United States Patent
Najaf-Zadeh et al.

(10) Patent No.: US 11,348,283 B2
(45) Date of Patent: May 31, 2022

(54) POINT CLOUD COMPRESSION VIA COLOR SMOOTHING OF POINT CLOUD PRIOR TO TEXTURE VIDEO GENERATION

(71) Applicant: Samsung Electronics Co., Ltd., Suwon-si (KR)

(72) Inventors: Hossein Najaf-Zadeh, Allen, TX (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 16/503,437

(22) Filed: Jul. 3, 2019

(65) Prior Publication Data

US 2020/0020133 A1 Jan. 16, 2020

Related U.S. Application Data

(60) Provisional application No. 62/696,195, filed on Jul. 10, 2018, provisional application No. 62/696,215, filed on Jul. 10, 2018.

(51) Int. Cl.
*G06T 9/00* (2006.01)
*G06T 3/40* (2006.01)
*H04N 19/91* (2014.01)
*G06T 7/50* (2017.01)
(Continued)

(52) U.S. Cl.
CPC .............. *G06T 9/00* (2013.01); *G06K 9/6273* (2013.01); *G06T 3/40* (2013.01); *G06T 5/002* (2013.01); *G06T 7/50* (2017.01); *H04N 19/91* (2014.11)

(58) Field of Classification Search
CPC .. G06T 9/00; G06T 3/40; G06T 5/002; H04N 19/91; G06K 9/6273
See application file for complete search history.

(56) References Cited

U.S. PATENT DOCUMENTS

| | | | |
|---|---|---|---|
| 6,271,861 B1 * | 8/2001 | Sargent | G06T 15/50 |
| | | | 345/589 |
| 8,175,384 B1 * | 5/2012 | Wang | G06T 7/12 |
| | | | 382/173 |
| 9,330,340 B1 * | 5/2016 | Diverdi | G06T 7/0002 |

(Continued)

OTHER PUBLICATIONS

Najaf-Zadeh et al., "[PCC] Improved point cloud compression efficiency in TMC2 via color smoothing of point cloud prior to texture video generation", ISO/IEC JTC1/SC29/WG11, MPEG 2018, m43721, Jul. 2018, 5 pages.

(Continued)

*Primary Examiner* — Qun Shen

(57) ABSTRACT

An encoding device and a decoding device is disclosed. The encoding device includes a processor and a communication interface. The processor is configured to generate, for a 3D point cloud, a first frame representing a first attribute and a second frame representing a second attribute. The first and second frames include patches representing respective clusters of points from the 3D point cloud. The processor is configured to generate an occupancy map frame. The processor is configured to identify a query point that is positioned on a boundary of one of the patches. The processor is configured to perform smoothing with respect to the query point. The processor is configured to encode the frames and generate a compressed bitstream. The communication is configured to transmit the compressed bitstream.

20 Claims, 20 Drawing Sheets

(51) Int. Cl.
*G06K 9/62* (2022.01)
*G06T 5/00* (2006.01)

(56) References Cited

U.S. PATENT DOCUMENTS

| | | | | |
|---|---|---|---|---|
| 2002/0061194 A1* | 5/2002 | Wu | ............... | G03B 35/00 |
| | | | | 396/324 |
| 2005/0057569 A1* | 3/2005 | Berger | ............... | G06K 9/00315 |
| | | | | 345/473 |
| 2010/0265358 A1* | 10/2010 | Cabral | ............... | H04N 5/3572 |
| | | | | 348/223.1 |
| 2012/0206452 A1* | 8/2012 | Geisner | ............... | H04S 7/304 |
| | | | | 345/419 |
| 2015/0154797 A1* | 6/2015 | Soulard | ............... | G06T 17/205 |
| | | | | 345/423 |
| 2018/0012400 A1* | 1/2018 | Evans | ............... | G06T 17/00 |
| 2019/0087979 A1* | 3/2019 | Mammou | ............... | H04N 19/597 |
| 2019/0156518 A1* | 5/2019 | Mammou | ............... | G06T 9/00 |

OTHER PUBLICATIONS

Najaf-Zadeh et al., "[PCC] On complexity reduction of geometry smoothing in TMC2", ISO/IEC JTC1/SC29/WG11, MPEG 2018, m43722, Jul. 2018, 5 pages.

Guede et al., "New Proposal on geometry smoothing", ISO/IEC JTC1/SC29/WG11, MPEG 2018, m46096, Jan. 2019, 8 pages.

Cai et al., "[VPCC][New proposal] Accelerate smoothing by nearest neighbor searching on 2D projection planes", ISO/IEC JTC1/SC29/WG11, MPEG 2019, m46456, Jan. 2019, 4 pages.

European Patent Office, "Supplementary European Search Report" dated Jun. 1, 2021, in connection with European Patent Application No. 19833203.3, 9 pages.

3DG, "PCC Test Model Category 2 v1", International Organisation for Standardisation, Coding of Moving Pictures and Audio, ISO/IEC JTC1/SC29/WG11, N17348, Gwangju, Republic of Korea, Jan. 2018, 11 pages.

* cited by examiner

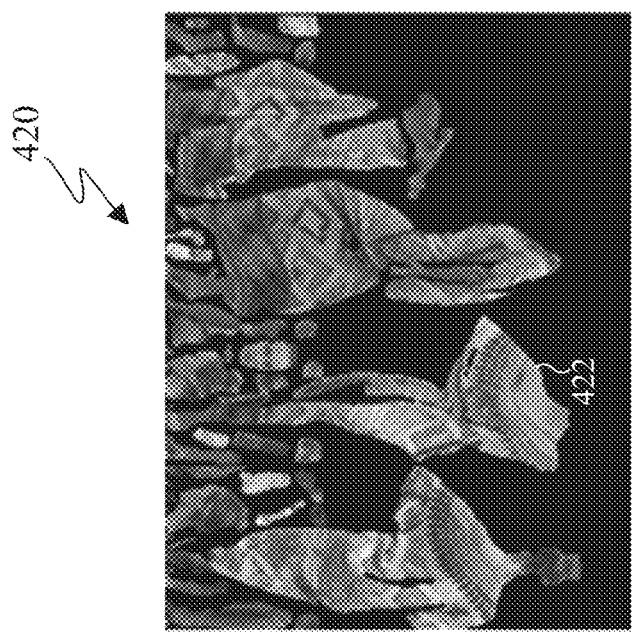
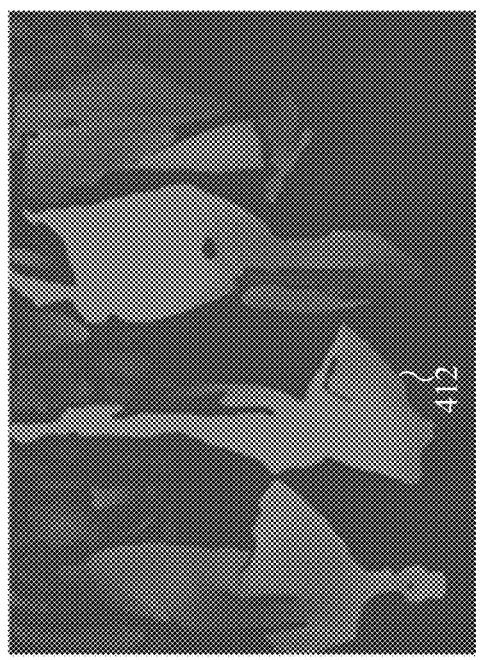
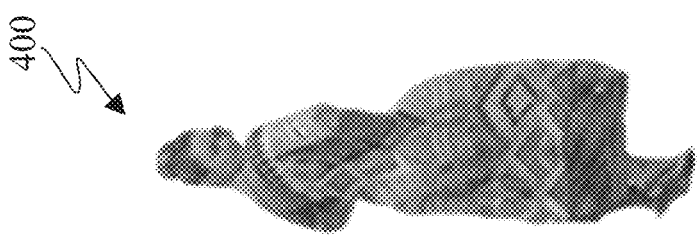
FIG. 4C
FIG. 4B
FIG. 4A

POINT CLOUD COMPRESSION VIA COLOR SMOOTHING OF POINT CLOUD PRIOR TO TEXTURE VIDEO GENERATION

CROSS-REFERENCE TO RELATED APPLICATIONS AND CLAIM OF PRIORITY

This application claims priority under 35 U.S.C. § 119(e) to U.S. Provisional Patent Application No. 62/696,195 filed on Jul. 10, 2018, and U.S. Provisional Patent Application No. 62/696,215 filed on Jul. 10, 2018. The above-identified provisional patent applications are hereby incorporated by reference in its entirety.

TECHNICAL FIELD

This disclosure relates generally to multimedia data. More specifically, this disclosure relates to apparatus and a method for compressing and decompressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds are can be used in the immersive environment.

Point clouds are a set of 3D points that represent an objects surface. Point clouds are common in a variety of applications such as gaming, 3D maps, visualizations, medical applications, augmented reality, virtual reality, autonomous driving, multi-view replay, 6DoF immersive media, to name a few. Point clouds, if uncompressed, generally require a large amount of bandwidth for transmission. Due to the large bitrate requirement, point clouds are often compressed prior to transmission. To compress a 3D object such as a point cloud, often requires specialized hardware. To avoid specialized hardware to compress a 3D point cloud, a 3D point cloud can be manipulated onto traditional two-dimensional (2D) frames and that can be compressed and later be reconstructed and viewable to a user.

SUMMARY

This disclosure provides improved point cloud compression via color smoothing of point cloud prior to texture video generation.

In a first embodiment, an encoding device for point cloud encoding is provided. The encoding device includes a processor and a communication interface operably coupled to the processor. The processor is configured to generate, for a 3D point cloud, a first frame and a second frame. The first frame representing a first attribute of the 3D point cloud and the second frame representing a second attribute of the 3D point cloud. The first frame and the second frame include patches representing respective clusters of points from the 3D point cloud. The processor is also configured to generate an occupancy map frame indicating pixels from the first and second frames that correspond to the points of the 3D point cloud. The processor is further configured to identify a query point of the 3D point cloud that is positioned on a boundary of one of the patches. The processor is additionally configured to perform smoothing with respect to the query point, wherein the smoothing modifies at least one of the first attribute or the second attribute of the query point. The processor is configured to encode the first frame, the second frame, and the occupancy map frame and generate a compressed bitstream from the first frame, the second frame, and the occupancy map frame. The communication interface is configured to transmit the compressed bitstream.

In another embodiment, a decoding device for point cloud decoding is provided. The decoding device includes a communication interface and a processor that is operably coupled to the communication interface. The communication interface is configured to receive a bitstream. The processor is configured to decode from the bitstream a first frame representing a first attribute of a three-dimensional (3D) point cloud and a second frame representing a second attribute of the 3D point cloud. The first frame and the second frame include patches representing respective clusters of points from the 3D point cloud. The processor is also configured to decode from the bitstream an occupancy map frame indicating pixels, from the first and second frames, that correspond to the points of the 3D point cloud. The processor is further configured to identify a query point of the 3D point cloud that is positioned on a boundary of one of the patches. The processor is additionally configured to perform geometry smoothing with respect to the query point, wherein the smoothing modifies the first attribute of the query point. After performing the geometry smoothing, the processor is configured to generate the 3D point cloud.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A, 4B, and 4C illustrate an example 3D point cloud and 2D frames, that represent the 3D point cloud in accordance with an embodiment of this disclosure;

DETAILED DESCRIPTION

Figure 1:
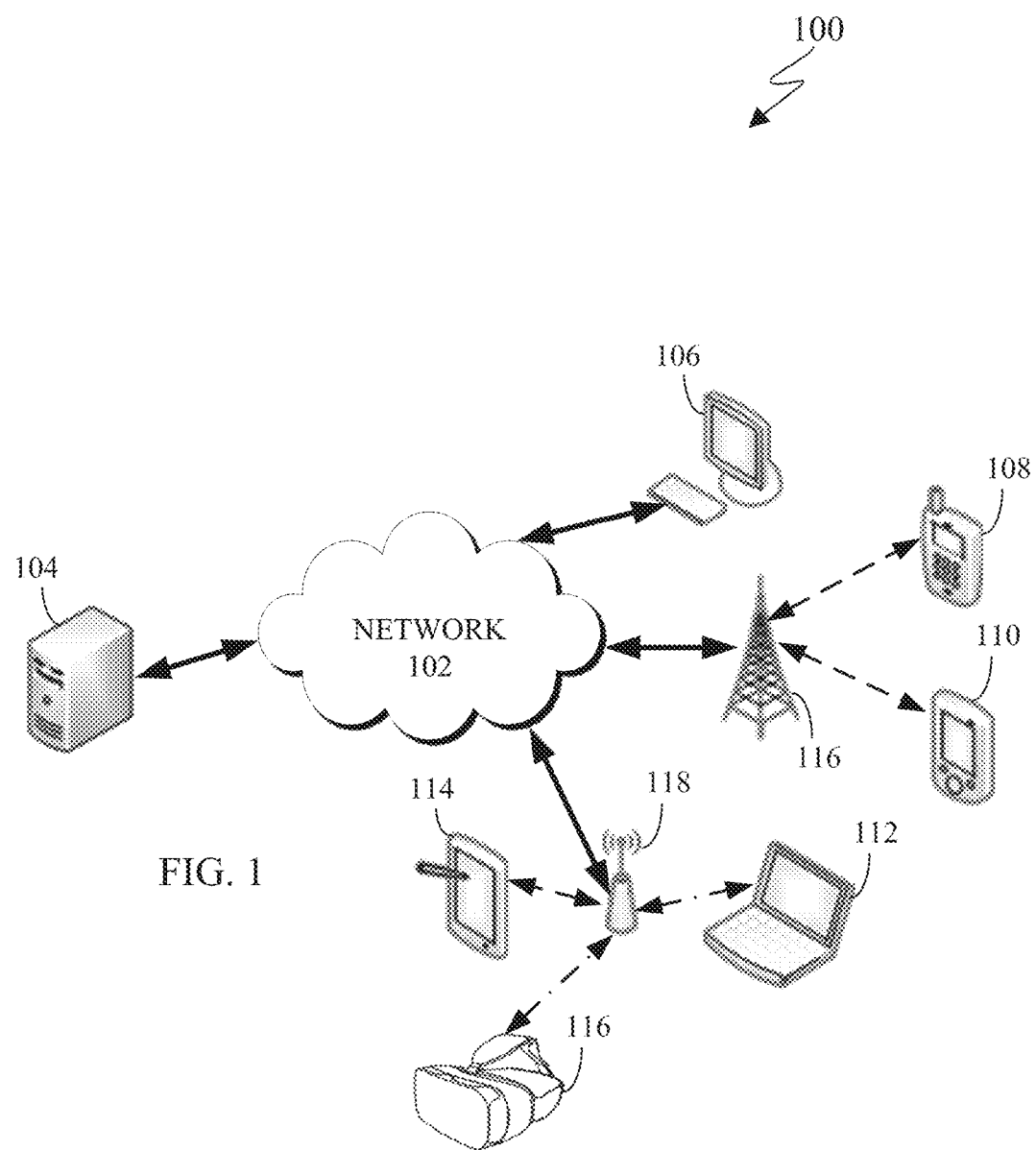
FIG. 1 illustrates an example communication system in accordance with an embodiment of this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Augmented reality (AR) is an interactive experience of a real world environment where objects that reside in the real-world environment are augmented with virtual objects, virtual information, or both. Virtual reality (VR) is a rendered version of a visual scene, where the entire scene is computer generated. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). An HMD is a device that enables a user to view the VR scene and adjust the displayed content based on movements of the head of the user. An HMD represent one of many types of devices that provide AR and VR experiences to a user. Typically, an HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point that is positioned in a particular position within 3D space and includes one or more attributes or textures. A point cloud can be similar to a virtual object in a VR or AR environment. A point mesh is another type of a virtual representation of an object in a VR or AR environment. A point cloud or a point mesh can be an object, multiple objects, a virtual scene (which includes multiple objects), and the like. Point clouds are commonly used in a variety of applications, including gaming, 3D mapping, visualization, medicine, AR, VR, autonomous driving, multi-view replay, 6 degrees of freedom immersive media, to name a few.

Point clouds represent volumetric visual data. Point clouds consist of multiple 3D points positioned in 3D space. Each point in a 3D point cloud includes an attribute such as a geometric position, represented by 3-tuple (X,Y,Z) coordinate values. When each point is identified by the three coordinates, a precise location in 3D environment or space is identified. In certain embodiments, the location in a 3D environment or space of each point is relative to an origin or relative to other points of the point cloud, or a combination thereof. The origin is a location where the X, Y, and Z axes intersect. In certain embodiments, the points are positioned on the external surface of the object. In certain embodiments, the points are positioned throughout the internal structure and external surfaces of the object. Additionally, depending upon the application, each point in the point cloud can also include additional attributes, (also referred to as textures) such as color, reflectance, intensity, surface normal, and the like. In some embodiments, a single point of a 3D point cloud can have multiple attributes. A texture can refer to an attribute other than the geometry attribute. A single point can have multiple attributers. For example, a first attribute can represent the geometric position of a point (such as a location of the point in 3D space), while a second attribute or texture can represent the color of the point, a third attribute or texture can represent the reflectiveness of the point, and yet the point can further include additional attributes or textures such as intensity, surface normal, and the like. In some embodiments, an attribute refers only to a texture of a point, and not a geometric position of the points. In some applications, point clouds can also be used to approximate light field data in which, each point includes multiple view-dependent, color information (R, G, B triplets).

A single point cloud can include billions of points, with each point associated with a geometric position and one or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, a texture corresponding to the color of a point cloud can consume twenty-four bits. For instance, if a color component of a single point is defined based on a Red value, Green value, and Blue value, then each color component (Red, Green, and Blue) uses eight bits, totaling the twenty-four bits. As a result, a single point with a ten bit geometric attribute data, per coordinate, and an eight bit color attribute data, per color value, occupies fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point clouds is necessary to expedite and improve transmission of the point cloud from one device (such as a source device) to another device (such as a display device) due to the bandwidth necessary to transmit the point cloud. Certain dedicated hardware components can be used to meet the real-time demands or reduce delays or lags in the transmitting and rendering a 3D point cloud; however, such hardware components are often expensive. Additionally, many video codecs are not able to encode and decode 3D video content, such as a point cloud. Compressing and decompressing a point cloud by leveraging existing 2D video codecs enables the encoding and decoding of a point cloud to be widely available without the need for new or specialized hardware. According to embodiments of the present disclosure, leveraging existing video codecs can be used to compress and reconstruct a point cloud, when the point cloud is converted from a 3D state to a 2D state. In certain embodiments, the conversion of a point cloud includes projecting the clusters of points of the 3D point cloud onto 2D frames by creating patches that represent the point cloud. Thereafter, video codecs such as HEVC, AVC, VP9, VP8, JVNET, and the like can be used to compress the 2D frames representing the 3D point cloud similar to a 2D video.

Converting the point cloud includes projecting the point cloud to generate multiple patches and packing the patches onto one or more 2D frames, such that the frames can be compressed, and then transmitted to a display device. The frames can represent projections at different layers of the point cloud. The frames can also represent different attributes or textures of the point cloud, such as one frame includes values representing geometry positions of the points and another frame includes values representing color information associated with each of the points. A decoder reconstructs the patches within the 2D frames into the 3D point cloud, such that the point cloud can be rendered, displayed, and then viewed by a user. When the point cloud is deconstructed to fit on multiple 2D frames and compressed, the frames can be transmitted using less bandwidth than used to transmit the original point cloud. FIGS. 4A-4C, which are described in greater detail below, illustrate a 3D point cloud that is projected onto 2D frames by creating patches of the point cloud and two attributes.

Embodiments of the present disclosure provide systems and methods for converting a point cloud into a 2D state that can be transmitted and then reconstructed into the point cloud. In certain embodiments, a point cloud is deconstructed into multiple patches, and multiple frames are generated that include the patches. In certain embodiments, a frame includes patches of the same attributes. The points of the 3D point cloud that are represented in one patch in one frame correspond to the same points that are represented in another patch in a second frame. In other embodiments, the patches on one frame represent multiple attributes associated with the points of the point cloud, such as a geometric position of the points in 3D space and color.

An encoder projects the 3D point cloud onto the multiple 2D frames and generates a bitstream. The encoder or another device then transmits the bitstream to different device. The frames can be compressed by leveraging various video compression codecs, image compression codecs, or both. A decoder receives the bitstream, decompresses the bitstream into the frames, and reconstructs the point cloud based on the information within the frames. After the point cloud is reconstructed, the 3D point cloud can be rendered and displayed for a user to observe. In certain embodiments, frames representing different attributes (including the geometric positions of the points) are encoded and decoded separately. In other embodiments, frames representing different attributes (including the geometric positions of the points) are encoded and decoded together.

During projection the encoder decomposes the point cloud into a set of patches by clustering the points. The geometry and texture information of these patches are packed into geometry video frames and texture video frames, respectively. The geometry video frames are used to encode the geometry information, and the corresponding texture video frames are used to encode the texture (or other attributes) of the point cloud. Each point within a patch in the geometry video frame corresponds to a point in 3D space. The two transverse coordinates (with respect to the projection plane) of a 3D point corresponds to the column and row indices in the geometry video frame plus a transverse-offset which determines the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

Embodiments of the present disclosure provide systems and methods for improving the deconstruction, compression, decompression, transmission, and reconstruction of a 3D point cloud. Improving the compression and decompression of a 3D point cloud reduces the bandwidth required for the transmission as well as reduces the processing power required to reconstruct the 3D point cloud. For example, the compression of the 2D frames that represent the 3D point cloud can be improved by smoothing the boundaries of the patches.

According to embodiments of the present disclosure, architecture and methods for performing point cloud compression and decompression using a video codec is provided. When a 3D point cloud is converted from a 3D state to a 2D state, the points of 3D point cloud are clustered into groups and projected onto frames, where the clustered points result in patches that are packed onto 2D frames. Due to the size constraints of certain 2D frames, two patches that are not next to each other on the 3D point cloud can be packed next to each other in a single frame. When two non-neighboring patches of the point cloud are packed next to each other in a 2D frame, the pixels from one patch can be inadvertently included with the pixels from the other patch. When pixels from one patch are inadvertently included in another patch, visible artifacts can occur at patch boundaries when the point cloud is reconstructed by the decoder. Therefore, embodiments of the present disclosure provide systems and methods for smoothing both position (geometry) and each additional texture (such as color) of the points near the patch boundary to avoid visual artifacts. Removing visual artifacts improves the visual quality of the point cloud. Geometry smoothing can be performed at the encoder, the decoder, or both the encoder and the decoder. Smoothing the color component of the point cloud at the encoder can lead to higher compression efficiency yielding an improved visual quality for a given bitrate.

Embodiments of the present disclosure provide systems and methods for improving coding efficiencies of video-based compression of point clouds. For example, the color of points at a patch boundary is smoothed before mapping the points into a 2D frame that corresponds to the color attribute.

Embodiments of the present disclosure also provide systems and methods for reducing complexity of geometry smoothing filter in point cloud compression. By smoothing only the points near a boundary of a patch reduces the number of points that are smoothed, which reduces the processing power required to perform geometry smoothing.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 can then compress 3D point cloud to generate a bitstream and then transmit the bitstream to one or more of the client devices 106-116. For another example, one of the client devices 106-116 can compress a 3D point cloud to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
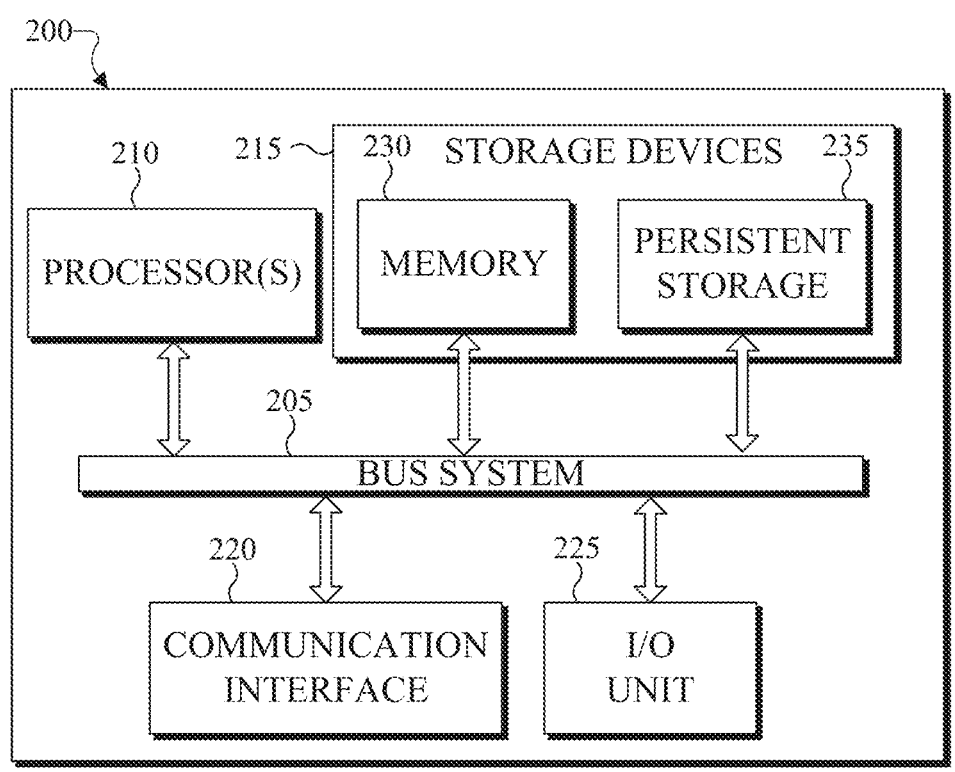
FIGS. 2 and 3 illustrate example electronic devices in accordance with an embodiment of this disclosure.
Figure 3:
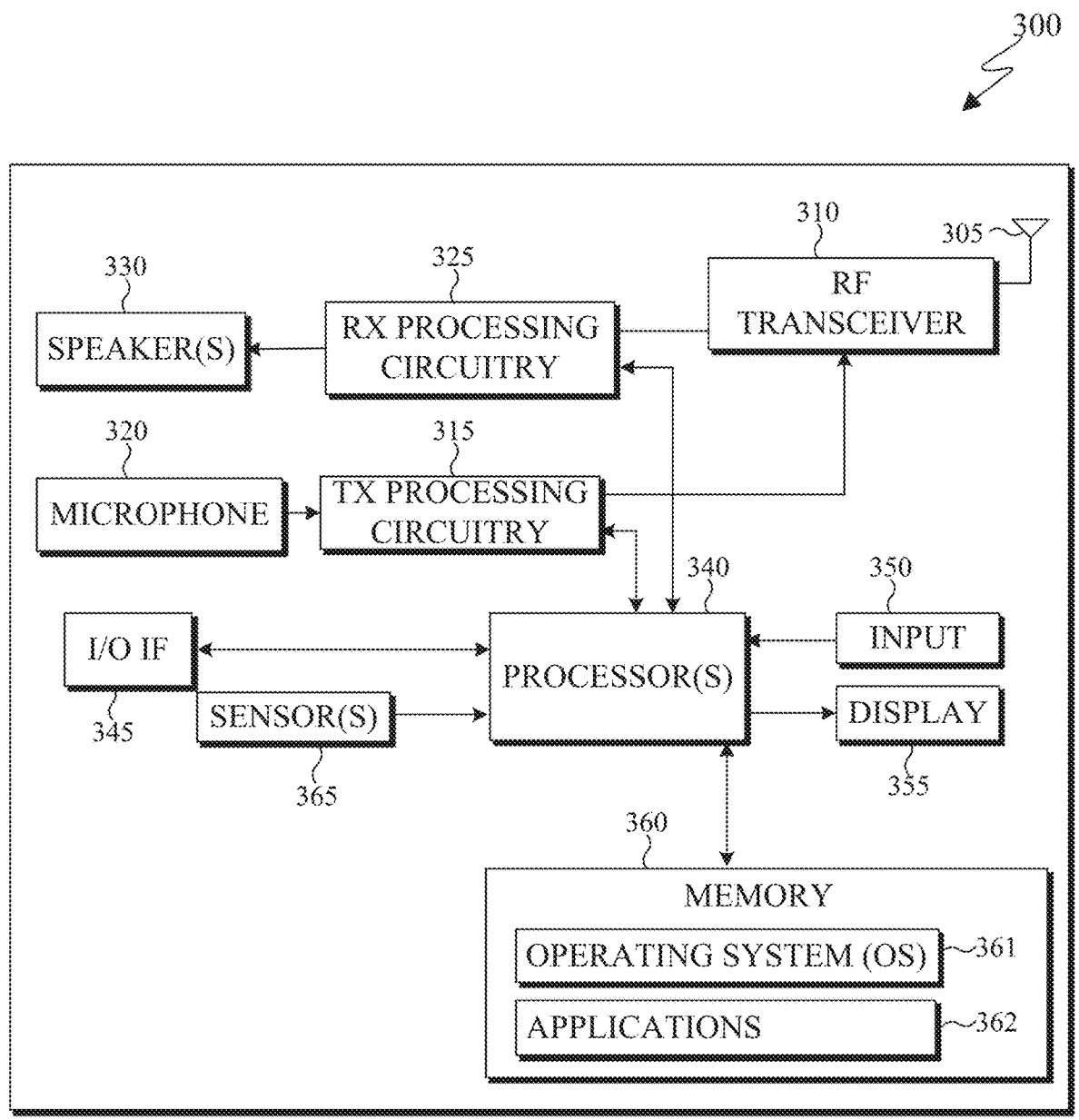

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, encoding a 3D point cloud also decodes the 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 downconverts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a point cloud, the electronic device 300 can project the point cloud into multiple patches. For example, a cluster of points of the point cloud can be grouped together to generate a patch. A patch can represent a single attribute of the point cloud, such as geometry, color, and the like. Patches that represent the same attribute can be packed into individual 2D frames, respectively. FIGS. 4A-4C, which are described in greater detail below, illustrate a 3D point cloud that is represented by patches on different frames.

The 2D frames are then encoded to generate a bitstream. The frames can be included individually or together. During the encoding process additional content such as metadata, flags, occupancy maps, and the like can be included in the bitstream.

Similarly, when decoding media content included in a bitstream that represents a 3D point cloud, the electronic device 300 decodes the received bitstream into frames. In certain embodiments, the decoded bitstream also includes an occupancy map. The decoded bitstream can also include one or more flags, or quantization parameter size, or any combination thereof. A geometry frame can include pixels that indicate geographic coordinates of points of the point cloud in 3D space. Similarly, a color frame can include pixels that indicate the RGB color of each geometric point in 3D space. In certain embodiments, an individual frame can include points from different layers. In certain embodiments, after reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

FIGS. 4A, 4B, and 4C illustrate an example 3D point cloud and 2D frames that represent the 3D point cloud in accordance with an embodiment of this disclosure. In particular, FIG. 4A illustrates a 3D point cloud 400, and FIGS. 4B and 4C each illustrate a 2D frame that includes patches. The FIG. 4B illustrates a 2D frame 410 that represents the geometric position of points of the 3D point cloud 400. The FIG. 4C illustrates the frame 420 that represents the color associated with points of the 3D point cloud 400. The embodiment of FIGS. 4A, 4B, and 4C, are for illustration only and other embodiments could be used without departing from the scope of this disclosure.

The 3D point cloud 400 is a set of data points in 3D space. Each point of the 3D point cloud 400 includes multiple attributes such as (i) geometric position that provides the structure of the 3D point cloud and (ii) one or more textures that provide information about each point such as color, reflectiveness, material, and the like.

FIGS. 4B and 4C illustrate the 2D frames 410 and 420 respectively. The frame 410, depicts multiple patches (such as a patch 412) representing the depth values of the 3D point cloud 400. The frame 420, depicts multiple patches (such as a patch 422) representing the color of the 3D point cloud 400. Each pixel of color in the frame 420 corresponds to a particular geometry pixel in the frame 410. For example, a mapping is generated between each pixel in the frame 410 and the frame 420. The location of the patches within the 2D frames 410 and 420 can be similar for a single position of the 3D point cloud. For example, as the 3D point cloud 400 changes, new frames can be generated with different patches based on the new position the 3D point cloud.

Although FIGS. 4A, 4B, and 4C illustrate example point cloud and 2D frames representing a point cloud various changes can be made to FIGS. 4A, 4B, and 4C. For example, the point cloud and point mesh represent a single object, whereas in other embodiments, a point cloud or point mesh can represent multiple objects, scenery (such as a landscape), a virtual object in AR, and the like. In another example, the patches included in the 2D frames can represent other textures, such as luminance, material, and the like. FIGS. 4A, 4B, and 4C do not limit this disclosure to any particular 3D object(s) and 2D frames representing the 3D object(s).

Figure 5A:
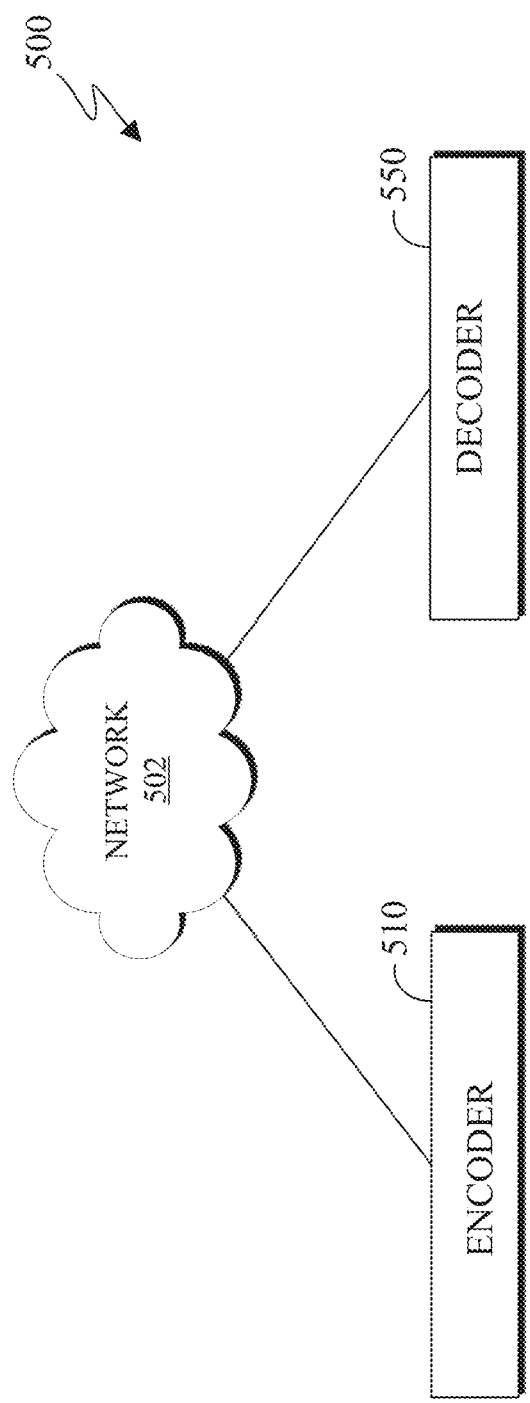
FIG. 5A illustrates a block diagram of an example environment-architecture in accordance with an embodiment of this disclosure.
Figure 5B:
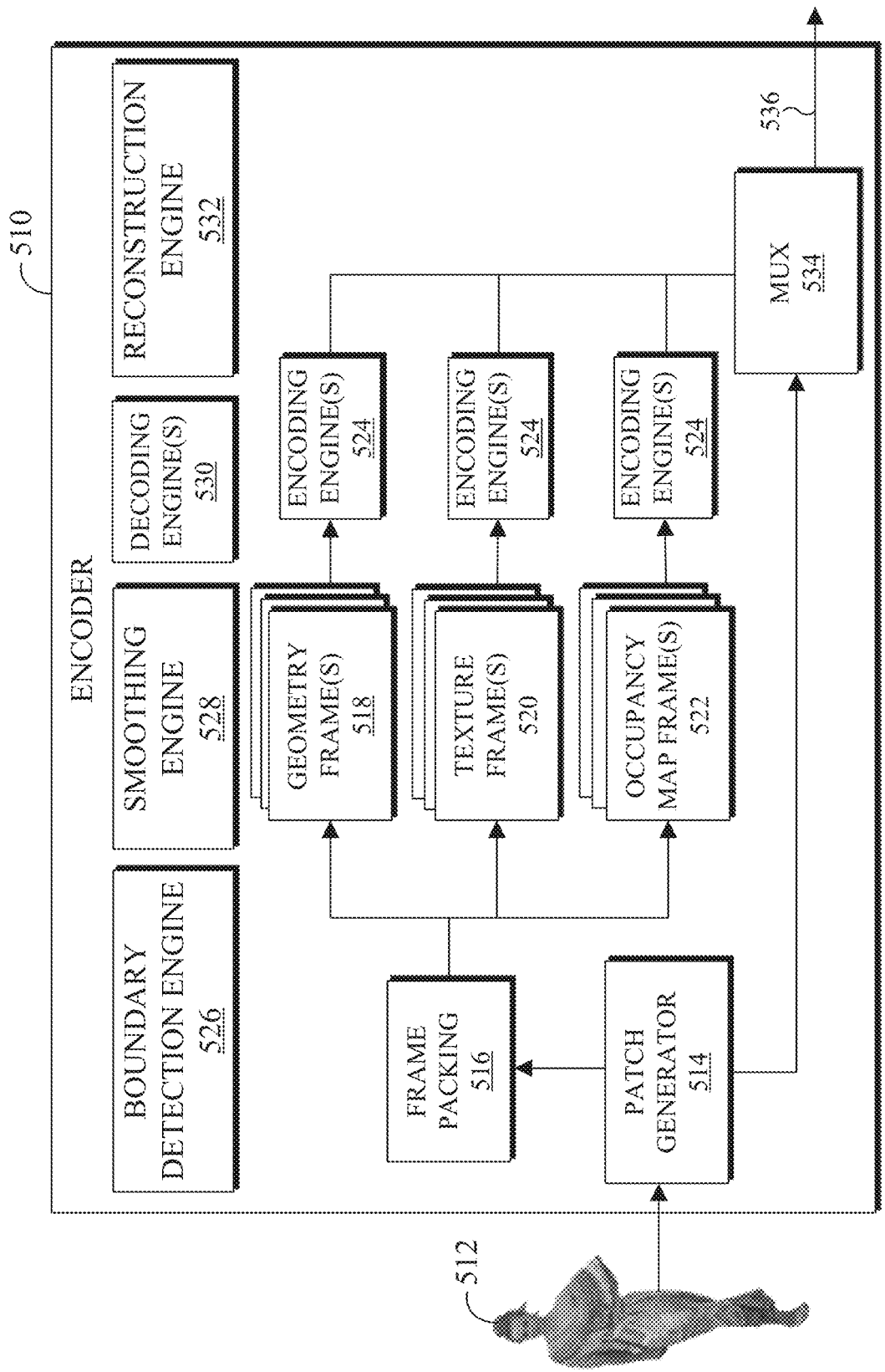
FIG. 5B illustrates an example block diagram of an encoder in accordance with an embodiment of this disclosure.
Figure 5C:
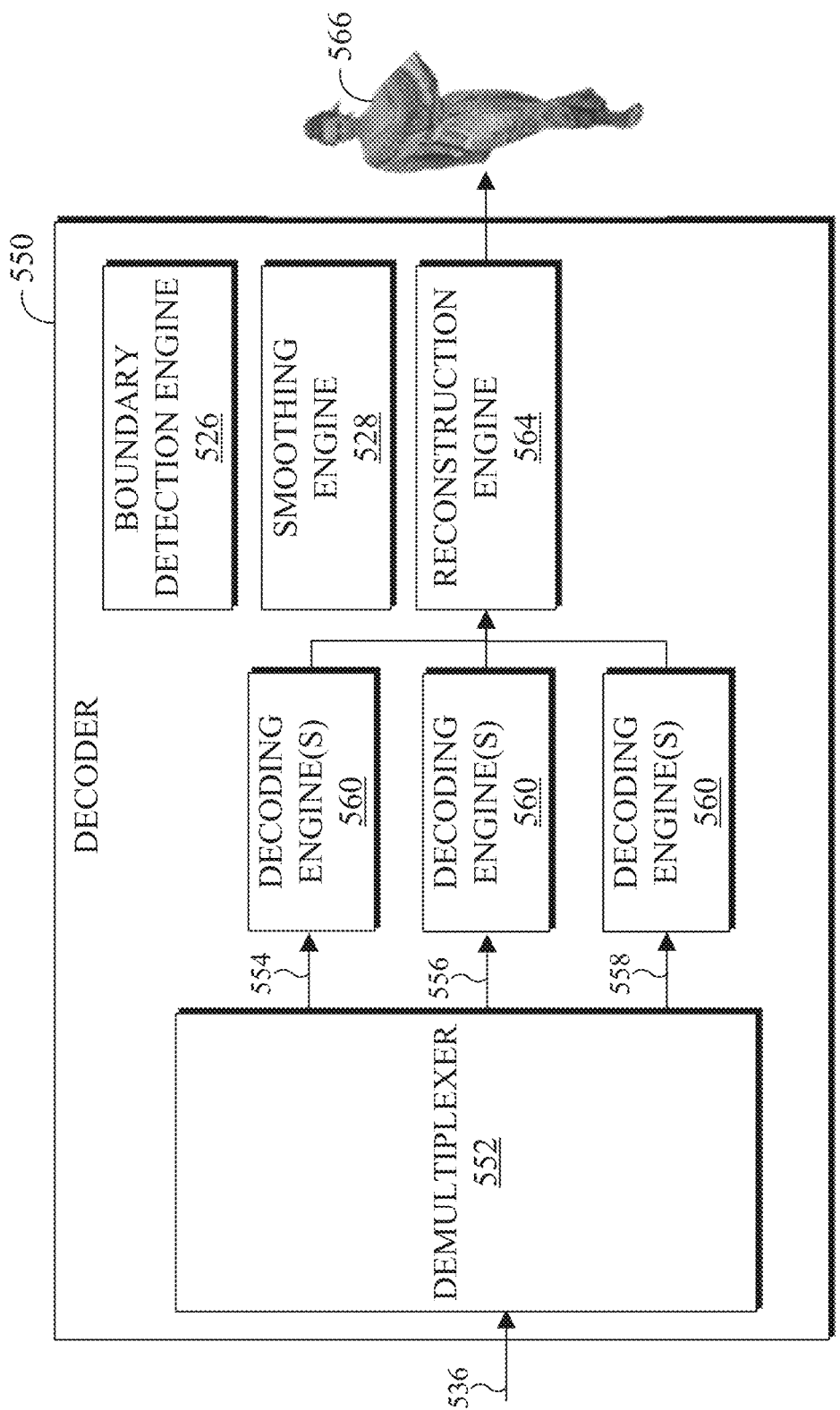
FIG. 5C illustrates an example block diagram of a decoder in accordance with an embodiment of this disclosure.
Figure 5D:
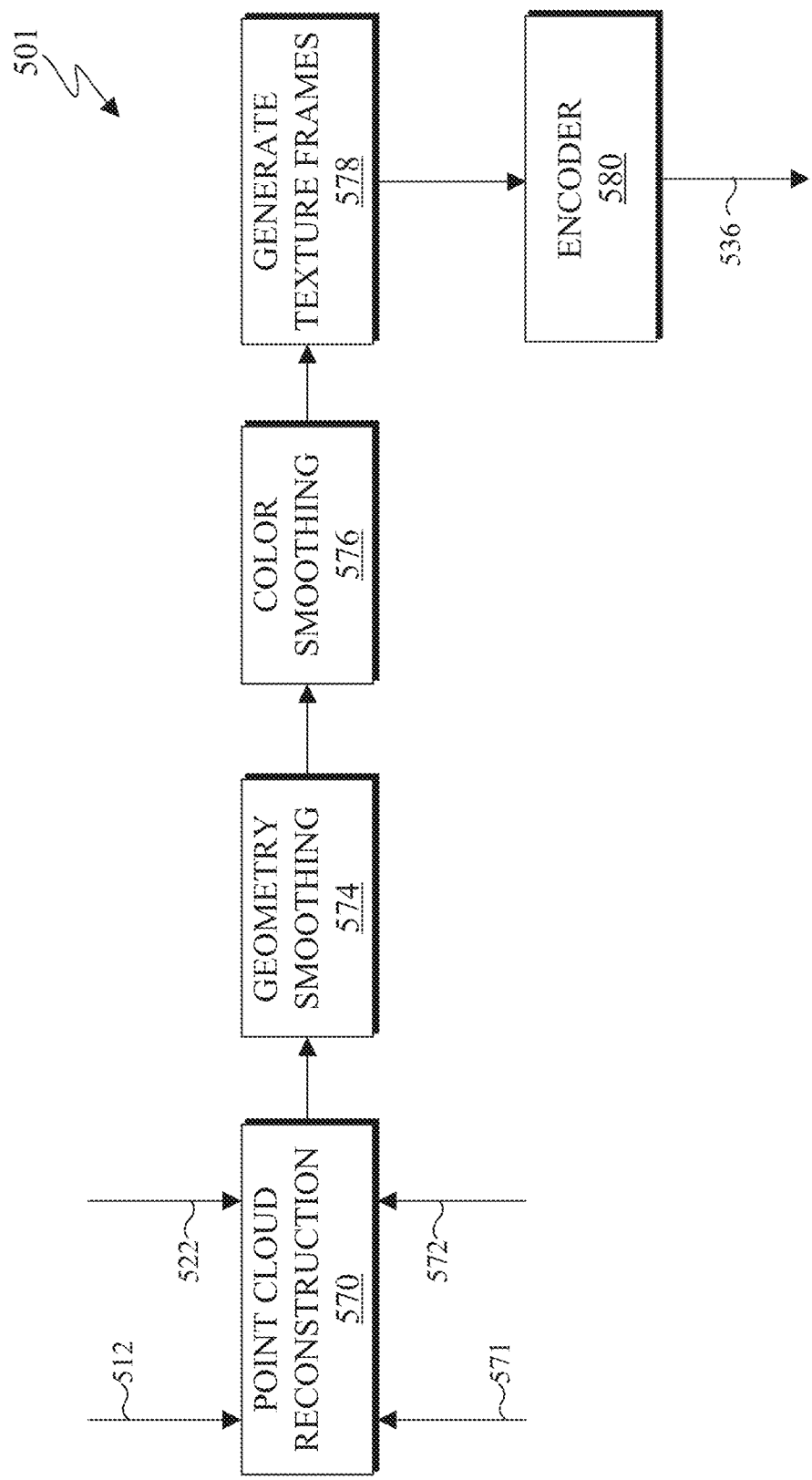
FIG. 5D illustrates a process of smoothing a point cloud in accordance with an embodiment of this disclosure.

FIGS. 5A, 5B, and 5C illustrate block diagrams, while FIG. 5D illustrates a pipeline process for encoding in accordance with an embodiment of this disclosure. In particular, FIG. 5A illustrates a block diagram of an example environment-architecture 500 in accordance with an embodiment of this disclosure. FIG. 5B illustrates an example block diagram of the encoder 510 of FIG. 5A in accordance with an embodiment of this disclosure. FIG. 5C illustrates an example block diagram of the decoder 550 of FIG. 5A in accordance with an embodiment of this disclosure. FIG. 5D illustrates and example process 501 of smoothing a point cloud, using the encoder 510 of FIG. 5A in accordance with an embodiment of this disclosure. The embodiments of FIGS. 5A, 5B, 5C, and 5D are for illustration only. Other embodiments can be used without departing from the scope of this disclosure.

As shown in FIG. 5A, the example environment-architecture 500 includes an encoder 510 and a decoder 550 in communication over a network 502.

The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, the server 200 of FIG. 2, the electronic device 300 of FIG. 3, or another suitable device. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

The encoder 510 is described with more below in FIG. 5B. Generally, the encoder 510 receive 3D media content, such as a point cloud, from another device such as a server (similar to the server 104 of FIG. 1, the server 200 of FIG. 2) or an information repository (such as a database). In certain embodiments, the encoder 510 can receive media content from multiple cameras and stitch the content together to generate a 3D scene that includes one or more point clouds.

In certain embodiments, the encoder 510 clusters points of a point cloud into groups which are projected onto different planes such as an XY plane, an YZ plane, and an XZ plane. Each cluster of points is represented by a patch when projected onto a plane. The encoder 510 can project a point cloud into two dimensions. The encoder 510 packs the cluster of points or patches representing the point cloud onto 2D video frames. After the points of the point cloud are projected onto a 2D frame, the points are referred to as pixels or points interchangeably.

The encoder 510 can identify points on the 3D point cloud that are on or near a boundary of one of the patches. The encoder 510 can also smooth the attributes or textures associated with points at patch boundaries. For example, the encoder 510 can smooth the geometry component of a point of the 3D point cloud at or near a boundary of one of the patches. Similarly, the encoder 510 can smooth the color component of a point of the 3D point cloud at or near a boundary of one of the patches.

The encoder 510 transmits frames representing the point cloud as an encoded bitstream. The bitstream can be transmitted to an information repository (such as a database) or an electronic device that includes a decoder (such as the decoder 550), or the decoder 550 itself through the network 502. The encoder 510 is described in greater detail below in FIG. 5B.

The decoder 550 can receive a bitstream that represents media content, such as a point cloud. The bitstreams can include data representing a 3D point cloud. In certain embodiments, the decoder 550 can decode the bitstream and generate multiple frames, where the frames include regular patches and an additional points patch. The decoded frames can represent different attributes of a point cloud, such as geometry and texture. The decoder 550 can identify points on the 3D point cloud that are on or near a boundary of one of the patches. The decoder 550 can also smooth a geometry component of a point at or near a boundary of one of the patches. The decoder 550 can also reconstruct the point cloud from multiple frames. For example, when reconstructing the point cloud, the decoder 550 uses the data that is retrieved from the regular patches as well as the data included in the additional points patch. The decoder 550 is described with more below in FIG. 5C.

FIG. 5B illustrates the encoder 510 that generates a bitstream 536 that includes data representing a received 3D point cloud 512. The bitstream 536 which can include multiple bitstreams and can be transmitted via the network 502 of FIG. 5A to another device, such as the decoder 550. The encoder 510 can identify points at or near a boundary of a point and determine whether or not to smooth the identified points. The encoder 510 includes a patch generator 514, a frame packing 516, various frames (such as one or more geometry frames 518, one or more texture frames 520, and one or more occupancy map frames 522), one or more encoding engines 524, a boundary detection engine 526, a smoothing engine 528, a decoding engine 530, a reconstruction engine 532, and a multiplexer 534.

The point cloud 512 can be stored in memory (not shown) or received from another electronic device (not shown). The point cloud 512 can be a single 3D object, or a grouping of 3D objects. The point cloud 512 can be stationary object or an object which moves.

The patch generator 514 generates patches by taking projections of the point cloud 512. In certain embodiments, the patch generator 514 splits the geometry attribute and each texture attribute of each point of the point cloud 512. The patch generator 514 can use two or more projection planes, to cluster the points of the point cloud 512 to generate the patches. The geometry attribute and each texture attribute are eventually packed into respective geometry frames 518 or the texture frames 520.

For each input point cloud, such as the point cloud 512, the geometry attribute and one or more texture attributes (such as color) are clustered using one or more criteria. The criteria include a normal direction, a distance to projected frames, contiguity, and the like. After the points are clustered, the geometry attribute and a corresponding texture attribute for each point are projected onto planes, such as the XY plane, the YZ plane, or the XZ plane.

When projected, each cluster of points of the point cloud 512 appears as patch. Each a patch (also referred to as a regular patch) represents a particular attribute of the point cloud. For example, a single cluster of points can be represented as multiple patches on multiple frames, where each patch represents a different attribute. It is noted that patches representing different attributes of the same cluster of points include a correspondence or a mapping, such a pixel in one patch corresponds to the same pixel in another patch.

The frame packing 516 sorts and packs the patches (both the geometry and texture patches) into respective frames, such as the geometry frames 518 and the texture frames 520. As illustrated in FIGS. 4B and 4C, discussed above, the frame packing 516 organizes the by attributes and places the patches within corresponding frames, such as the patch 412 is included in the geometry frame 410 and the patch 422 is included in the texture frame 420.

Geometry (such as the geometry frames 410) represent is the geographic location of each point of the 3D point cloud 400. Texture (such as the texture frames 420) represents a single aspect of each point of the 3D point cloud 400, such as color. Each geometry frame 410 has at least one corresponding texture frame 420. For example, if the geometry frame 410 indicates where each point of the 3D point cloud 400 is in 3D space, then the corresponding texture frame 420 can indicate the color of each corresponding point. In certain embodiments, additional frames can be created that represent the other attributes. For example, if another set of frames are generated, such as reflectance frames (not shown) then the corresponding reflectance frame indicates the level of reflectance of each corresponding point within a corresponding geometry frame 410 and a corresponding texture frame 420.

In certain embodiments, frame packing 516 generates one or more occupancy map frames 522 based on the placement of the patches within the geometry frames 518 and the texture frames 520.

The geometry frames 518 include pixels representing the geometry values of the point cloud 512. The pixels representing the geometry values of the point cloud 512 are grouped into patches that represent a cluster of points of the 3D point cloud 512. The texture frames 520 include pixels representing values of a particular texture of the point cloud 512. The pixels representing the texture values of the point cloud 512 are grouped into patches that represent a cluster of points of the 3D point cloud 512.

The occupancy map frames 522 represent occupancy maps that indicate the valid pixel location in the frames (such as the geometry frames 518 and the texture frames 520). The valid pixels are the actual points of the 3D point cloud 512 which are projected into patches (via the patch generator 514) and packed into respective frames (via the frame packing 516). For example, the occupancy map frames 522 indicate whether each point in a frame is a valid pixel or an invalid pixel. A valid point on the occupancy map indicates a pixel on the frame that corresponds to a 3D point in the point cloud. If the occupancy map indicates that a point is an invalid pixel, then that the pixel does not correspond to a point of the 3D point cloud 512. The invalid points are locations of the frame that does not correspond to a point of the point cloud. In certain embodiments, one of the occupancy map frames 522 can correspond to the both a geometry frame 518 and a texture frames 520.

The geometry frames 518, the texture frames 520, and the occupancy map frames 522 are encoded via the encoding engine 524. In certain embodiments, the frames (such as the geometry frames 518, the texture frames 520, and the occupancy map frames 522) are encoded by independent encoders. For example, one encoding engine 524 can encode the geometry frames 518, another encoding engine 524 can encode the texture frames 520, and yet another encoding engine 524 can encode the occupancy map frames 522. In certain embodiments, the encoding engine 524 can be configured to support an 8-bit, a 10-bit, a 12-bit, a 14-bit, or a 16-bit, precision of data. The encoding engine 524 can be a video or image codec such as HEVC, AVC, VP9, VP8, JVNET, and the like to compress the 2D frames representing the 3D point cloud.

In certain embodiments, prior to encoding the geometry frames 518, the texture frames 520, and the occupancy map frames 522, blank areas in the frames are filled in with interpolated values from points at patch boundaries. Filling in blank areas with interpolated values is referred to as dilation. Dilation can improve the coding efficiency. Additionally, color smoothing (at the encoder 510) and geometry smoothing (at the encoder 510 and/or the decoder 550) can each improve the coding efficiency.

When the geometry frames 518, the texture frames 520, and the occupancy map frames 522 are encoded by the encoding engines 524, and later decoded at the decoder 550, pixels from one patch can be inadvertently included in another patch. As a result, visible artifacts can appear in the reconstructed point cloud, reducing the visual quality of the point cloud. For example, pixels within the geometry frame 518 (or the texture frames 520 or the occupancy map frames 522) can shift slightly. Generally, a slight shift may not significantly reduce the visual quality of the point cloud when the pixel is in the middle of a patch. However, a slight shift from one patch to another can cause considerable artifacts. For example, if one patch that includes the face of the 3D point cloud 400 of FIG. 4A, is packed next to the dress of the 3D point cloud 400 and a grouping of pixels shift from one patch to the other, then the reconstructed point cloud would have a pixels corresponding to a face on the dress and conversely, pixels corresponding to the dress on the face of the point cloud. Such a shift could cause a visible artifact that reduces the visual quality of the point cloud.

In order to reduce the appearance of artifacts, points of the 3D point cloud that are near a boundary of a patch can be smoothed to reduce a visual artifact. To reduce the occurrence or appearance of a visual artifact and increase compression efficiency, the smoothing can be applied to the geometry of the point cloud, each identified texture of the point cloud (such as color, reflectiveness, and the like), or both the geometry and the texture of the point cloud. Smoothing the geometry attribute and the color attribute are described below; however, it can be appreciated that other attributes can be smoothed as well.

In order to smooth an attribute of the 3D point cloud, the patch generator 514 generates the patches corresponding to different attributes of the point cloud 512 at different times. For example, the patch generator 514 generates patches that represent geometry values of the point cloud 512 prior to generating patches that represent any texture values of the point cloud 512. That is, first the patch generator 514 generates the patches corresponding geometry attribute of the point cloud 512. Thereafter, the frame packing 516 packs the patches corresponding geometry attribute of the point cloud 512 into the geometry frames 518. After the patches corresponding geometry attribute of the point cloud 512 into the geometry frames 518, the encoding engine 524 encodes the geometry frames 518. After the geometry frames 518 are encoded, a decoding engine 530 decodes the geometry frames 518. Once the geometry frame is decoded, a reconstruction engine 532 reconstructs the geometry of the point cloud. Once the reconstruction engine 532 reconstructs the geometry of the point cloud, the smoothing engine 528 can smooth the geometry of the point cloud at or near the batch boundaries.

Once the geometry of the point cloud is reconstructed from the geometry frames 518, the points near a boundary of a patch are smoothed. There are two types of smoothing the smoothing engine 528 can perform that of color smoothing, and geometry smoothing. Color smoothing can occur at the encoder 510 while the geometry smoothing can occur at the encoder 510, the decoder 550, or both the encoder 510 and the decoder 550.

In certain embodiments, the patch generator 514 and the frame packing 516 can create new patches and pack the patches into new geometry frames 518 based on the smoothed points near batch boundaries. The new geometry frames 518 can be encoded by the encoding engine 524. In other embodiments new geometry frames are not generated as the encoder 510 includes the original geometry frames 518 within the bitstream 536.

In certain embodiments, after the smoothing engine 528 smooths the geometry of the point cloud, the color from the points of the original point cloud are applied to the points of the reconstructed point cloud. After the color from the points of the original point cloud is applied to the points of the reconstructed point cloud, the smoothing engine 528 smooths the colors of the points at or near patch boundaries of the reconstructed 3D point cloud. Once the color of the points at or near the boundary point are smoothed, the patch generator 514 generates patches representing color of the reconstructed 3D point cloud, which are packed into the texture frames 520 by the frame packing 516.

In certain embodiments, the smoothing engine 528 does not smooth the geometry of the point cloud; rather color from the points of the original point cloud is applied to the points of the reconstructed point cloud. After the color from the points of the original point cloud is applied to the points of the reconstructed point cloud, the smoothing engine 528 smooths the colors of the points at or near patch boundaries of the reconstructed 3D point cloud. Once the color of the points at or near the boundary point are smoothed, the patch generator 514 generates patches representing color of the reconstructed 3D point cloud, which are packed into the texture frames 520 by the frame packing 516.

Figure 8A:
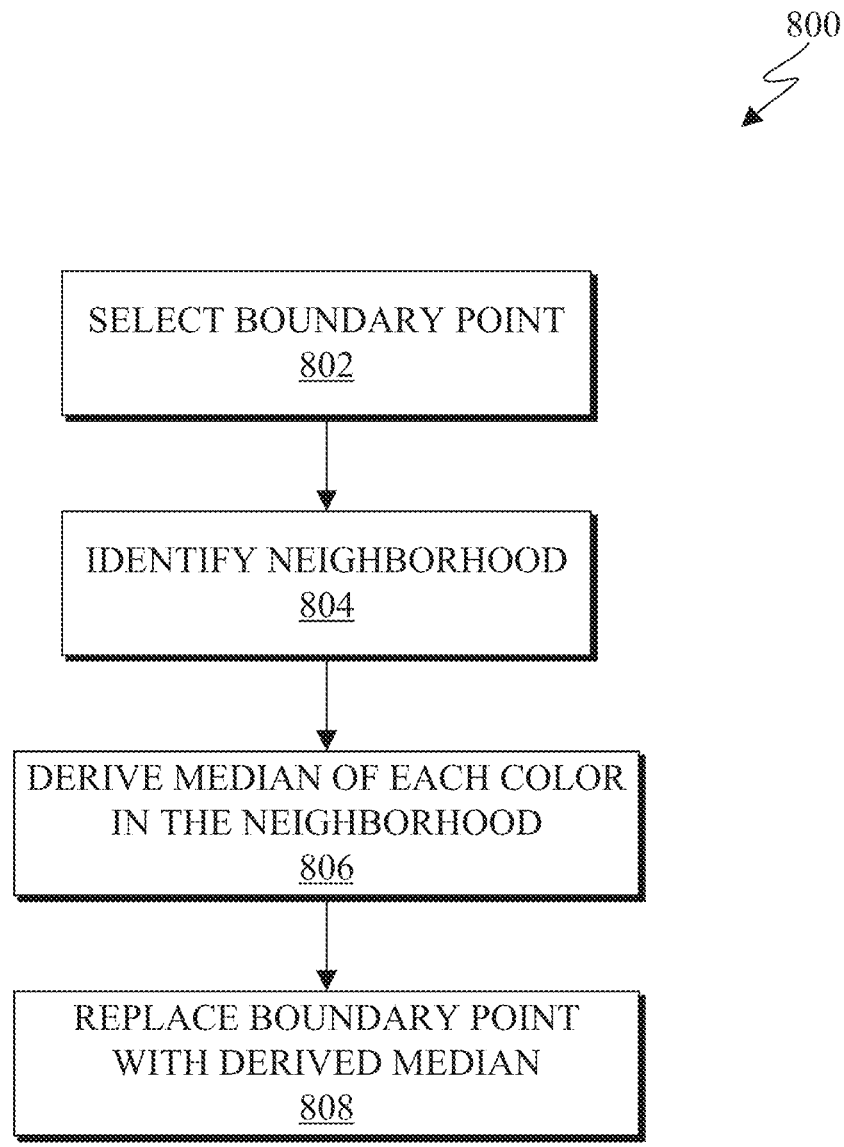
FIGS. 8A, 8B, and 8C illustrate example methods for color smoothing in accordance with an embodiment of this disclosure.
Figure 8B:
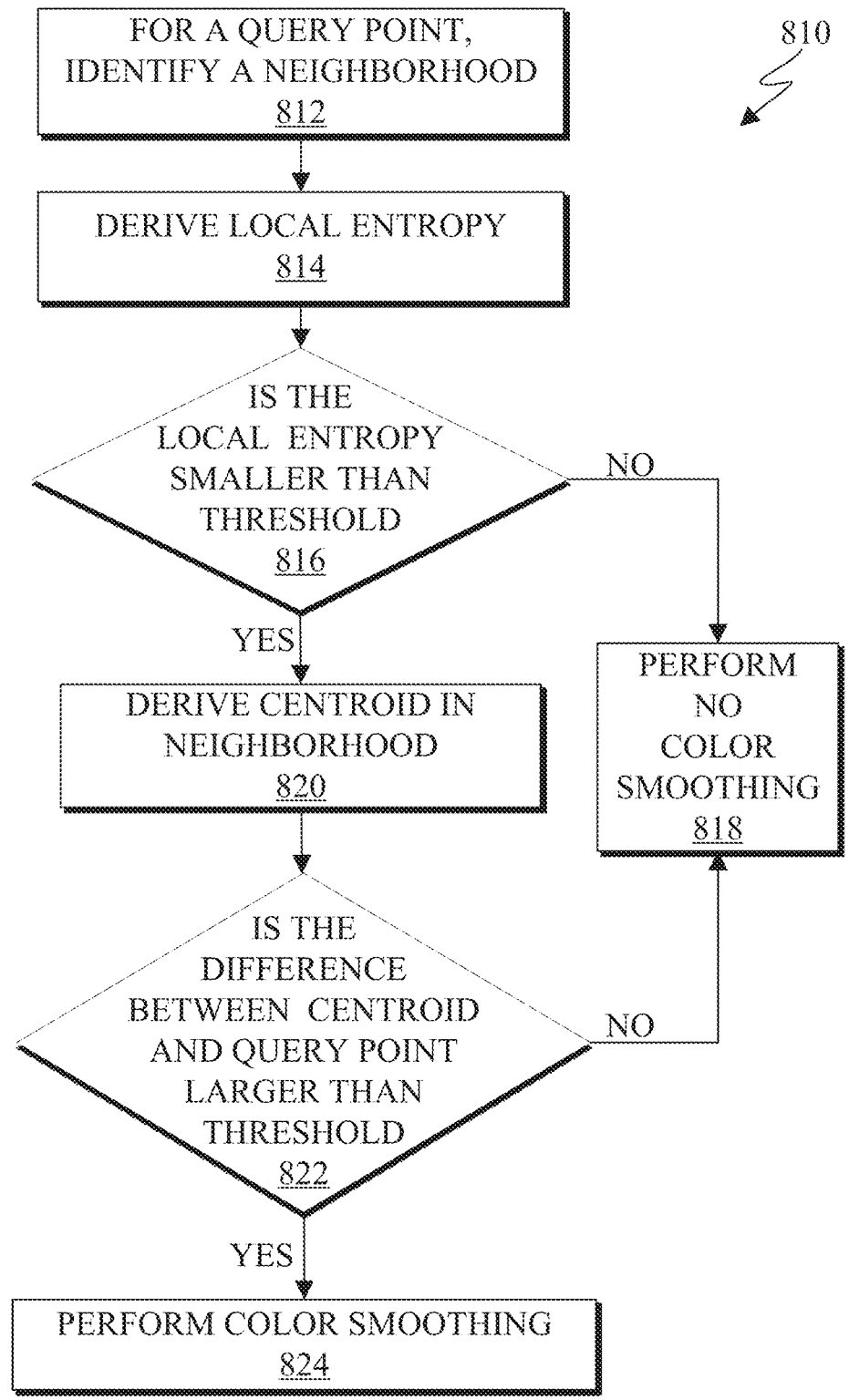
Figure 8C:
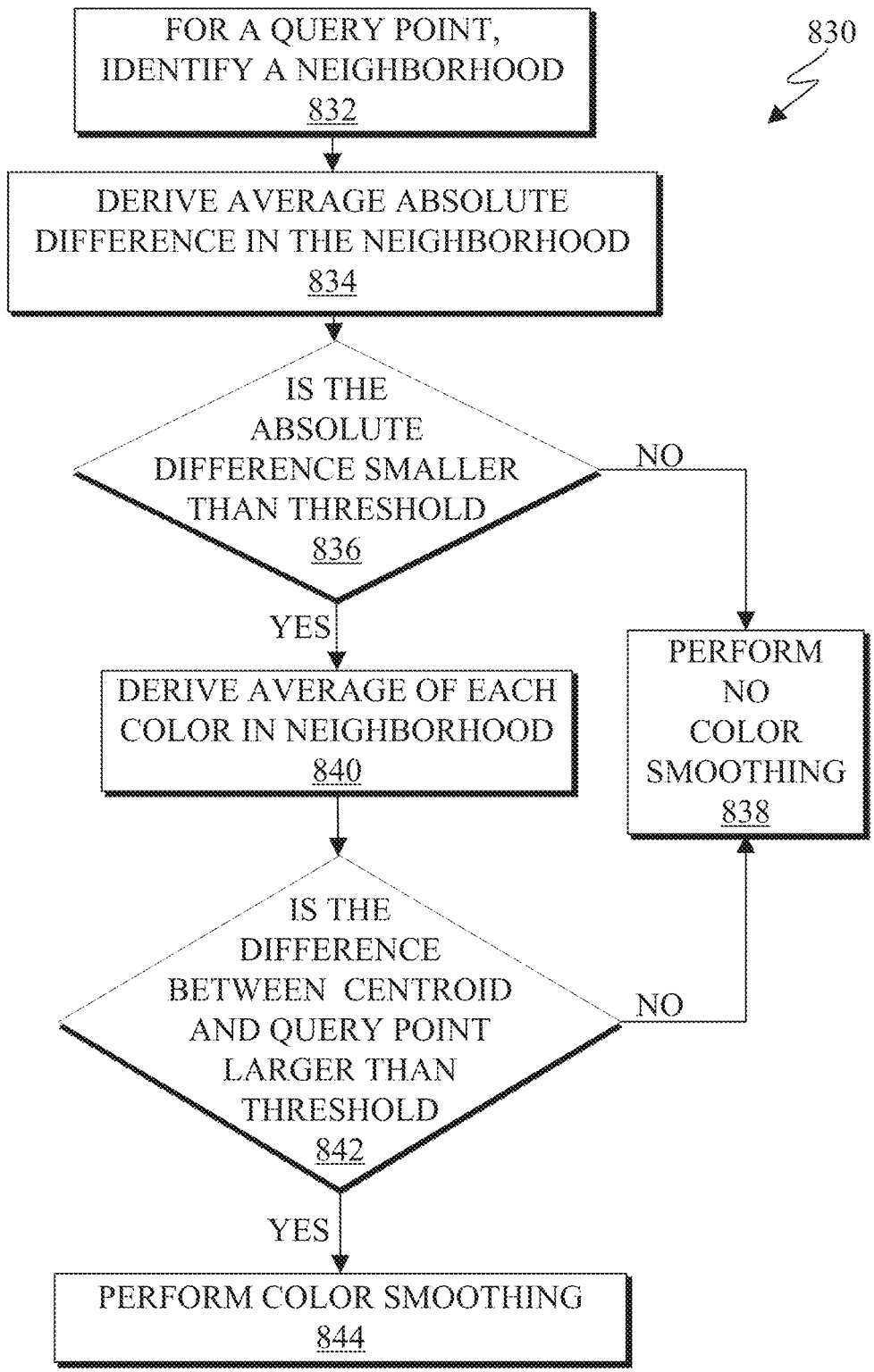

Regarding color smoothing, the color of points near patch boundaries in the point cloud are smoothed prior to mapping the point cloud onto the texture frames 520. For example, after the point cloud is reconstructed from the decoded geometry frame 518, the boundary detection engine identifies points near patch boundaries in the reconstructed point cloud. Thereafter the smoothing engine 528 smooths out the color of the selected points boundary points, the points in a small neighborhood around the selected points, or both the selected points boundary and the points in a small neighborhood around the selected points. FIGS. 8A, 8B, and 8C describe example methods for color smoothing.

Figure 9A:
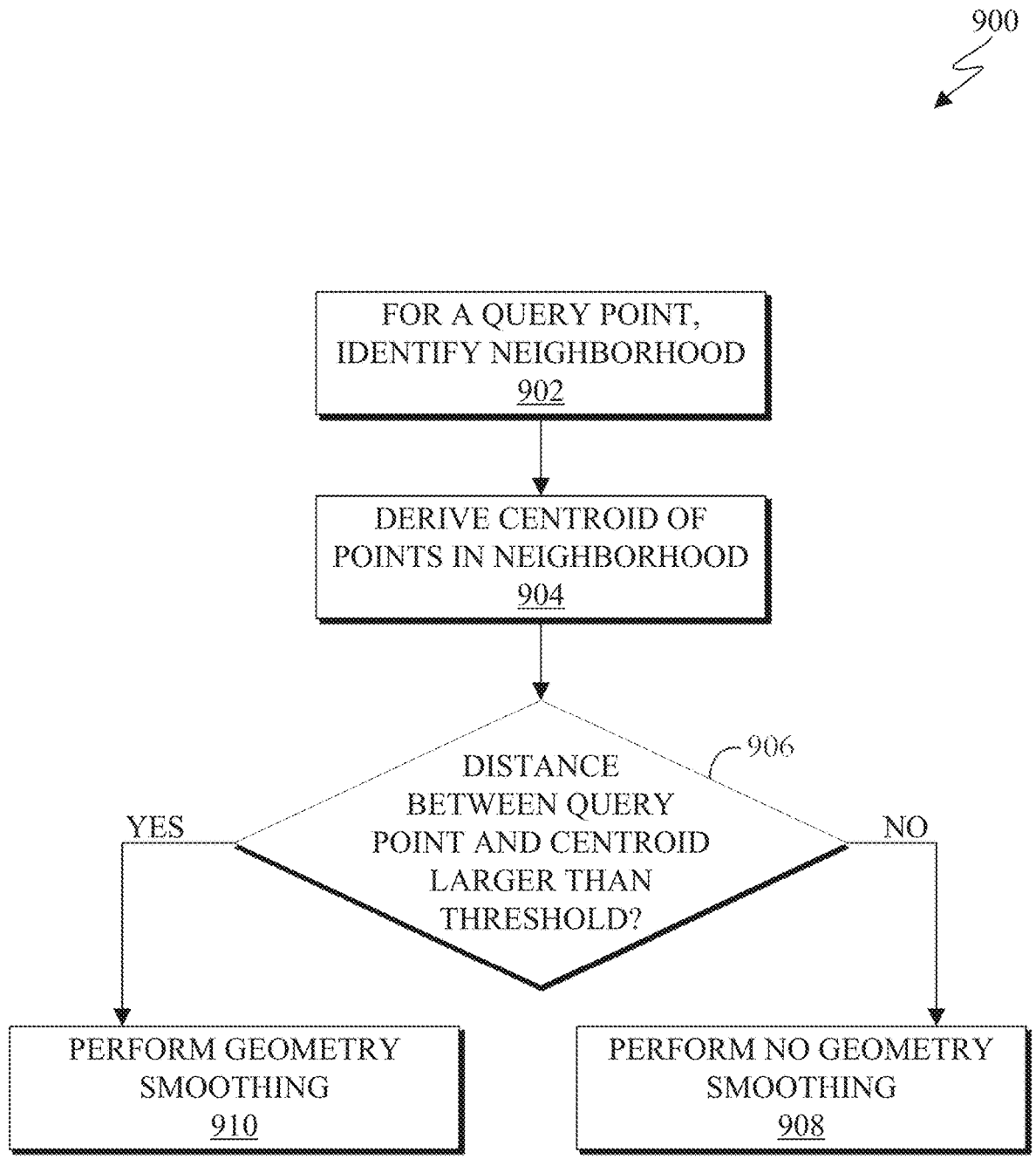
FIGS. 9A, 9B, and 9C; illustrate example methods for geometry smoothing in accordance with an embodiment of this disclosure.
Figure 9B:
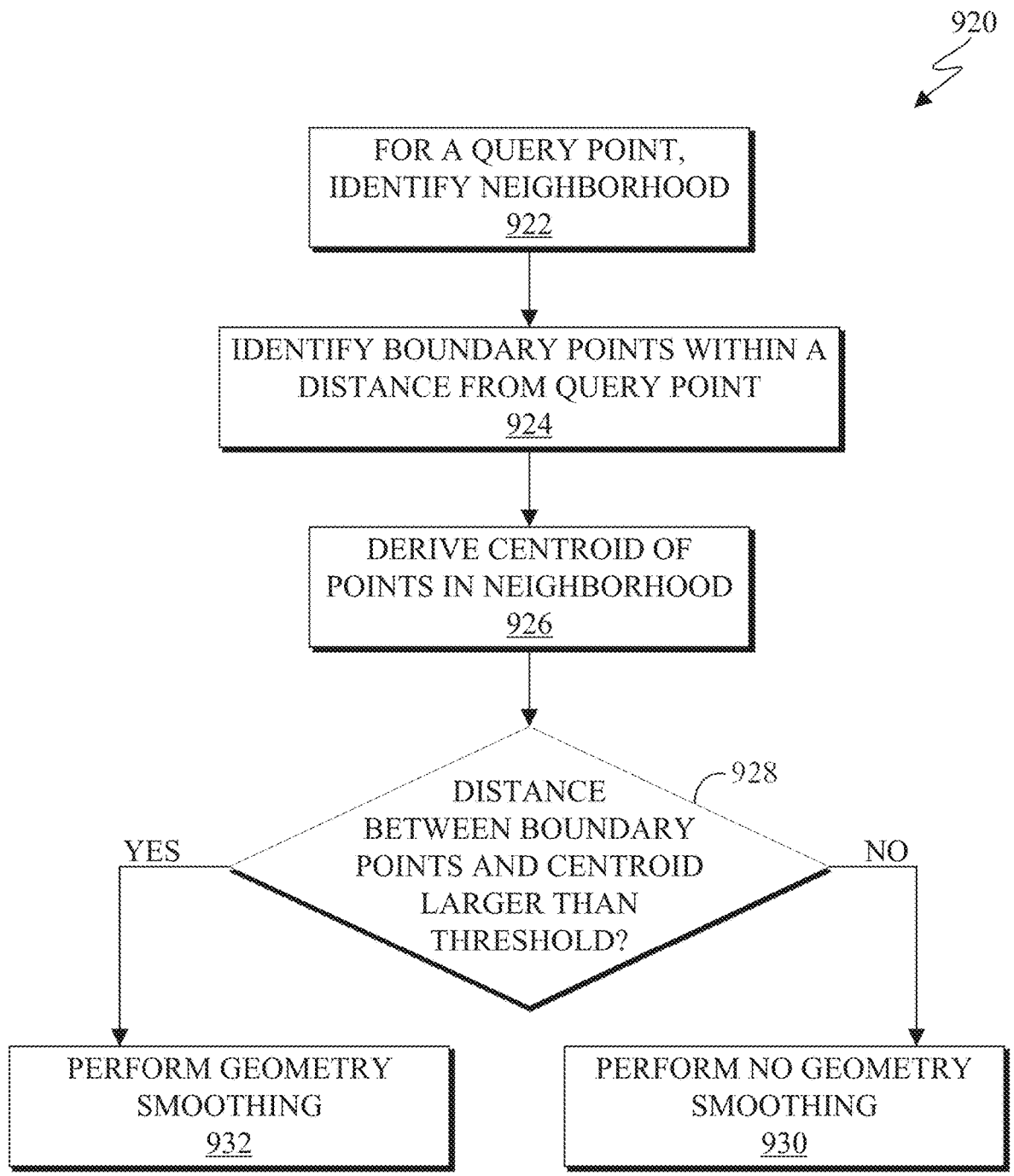
Figure 9C:
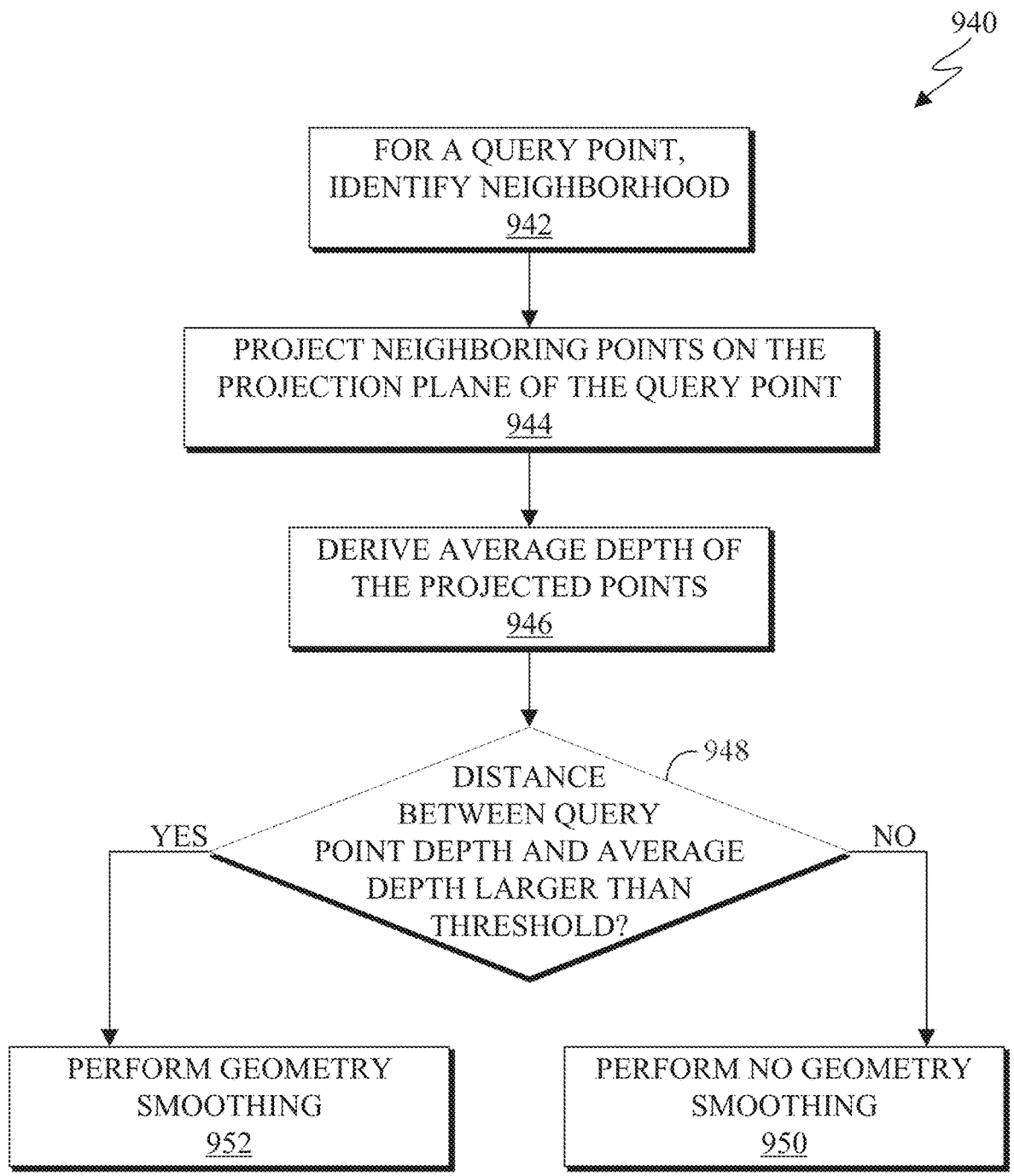

Regarding geometry smoothing, the position of points near patch boundaries in the point cloud are smoothed. For example, once the point cloud is reconstructed from the frames, the points near patch boundaries are identified. Thereafter the positions of the identified points are smoothed. In certain embodiments, once a boundary point is identified, additional points near the identified boundary point are also smoothed. FIGS. 9A, 9B, and 9C describe example methods for geometry smoothing.

The multiplexer 534 combines the multiple frames (such as the geometry frames 518, the texture frames 520, and the occupancy map frames 522) which are encoded, to create a bitstream 536.

FIG. 5C illustrates the decoder 550 that includes a demultiplexer 552, one or more decoding engines 560, and a reconstruction engine 564. The decoder 550 decompresses the compressed bitstream into decoded geometry, attribute, occupancy map video frames, along with any auxiliary information, such as a flag indicating whether the decoder 550 is to perform geometry smoothing.

FIG. 5C illustrates the decoder 550 that includes a demultiplexer 552, one or more decoding engines 560, a reconstruction engine 564, the boundary detection engine 526, and the smoothing engine 528. The decoder 550 decompresses the compressed bitstream into decoded geometry, attribute, occupancy map video frames, along with auxiliary information.

The decoder 550 receives a bitstream 536, such as the bitstream that was generated by the encoder 510. The demultiplexer 552 separates bitstream 536 into one or more bitstreams representing the different frames. For example, the demultiplexer 552 separates various streams of data such as the geometry frame information 554 (originally the geometry frames 518 of FIG. 5B), texture frame information 556 (originally the texture frames 520 of FIG. 5B), and the occupancy map information 558 (originally the occupancy map frames 522 of FIG. 5B).

The decoding engines 560 decode the geometry frame information 554, the texture frame information 556, and the occupancy map information 558. In certain embodiments, a single decoding engine 560 decodes the geometry frame information 554, the texture frame information 556, and the occupancy map information 558. After decoding the geometry frame information 554, the texture frame information 556, and the occupancy map information 558, multiple video frames representing the geometry and texture of the 3D point cloud as well as the and occupancy map frames are represented.

The boundary detection engine 526 and the smoothing engine 528 of the decoder 550 can be similar to the boundary detection engine 526 and the smoothing engine 528 of the encoder 510. The smoothing engine 528 of the decoder 550 only smooths the geometry of the point cloud. For example, after the decoding engines 560 decode the geometry frame information 554, the boundary detection engine 526 identifies points at or near patch boundaries within the geometry frame. The reconstruction engine 564 reconstructs the geometry of the point cloud. After the reconstruction engine 564 reconstructs the geometry of the point cloud, the smoothing engine smooths the geometry points in 3D space. After the geometry values associated with the points are smoothed, the decoded texture frames information is applied to the points.

The reconstruction engine 564 generates a reconstructed point cloud 566 by reconstructing the decoded geometry frame information 554, the decoded texture frame information 556, and the decoded occupancy map information 558. The reconstructed point cloud 566 is similar to the point cloud 512.

FIG. 5D illustrates a process 501 of smoothing a point cloud, using the encoder 510 of FIG. 5A in accordance with an embodiment of this disclosure. The process 501 uses the encoder 510 as illustrated in the environment-architecture 500. The process of 501 is a high level overview of embodiments of the present disclosure. The process 501 is for illustration only. Other embodiments can be used without departing from the scope of the present disclosure.

After the point cloud 512 is deconstructed, in step 570, the point cloud is reconstructed. For example, the reconstruction engine 532 (of FIG. 5B) receives the point cloud 512, the occupancy map frame 522, patch and packing information 571 and the decoded geometry frames 572. In certain embodiments, the geometry smoothing in step 574 and the color smoothing in step 576 are both performed. In other embodiments, the color smoothing in step 576 while the geometry smoothing in step 574 is omitted. In other embodiments, the geometry smoothing in step 574 is performed, while the color smoothing in step 576 is omitted.

When the smoothing engine 528 performs geometry smoothing at step 574, the positions of points near patch boundaries are smoothed. The boundary detection engine 526 (of FIG. 5B) identifies boundary points and neighbors of boundary points of the reconstructed point cloud. Points near patch boundaries are identified as boundary points. In certain embodiments, points that are adjacent to boundary points are also identified as boundary points. In certain embodiments, points that neighbor the boundary point can also be identified as boundary points. A neighboring point is a point that is within a radius of N points surrounding the query point. The boundary detection engine 526 identifies a query point, where the query point is a randomly selected point of the reconstructed point cloud. The boundary detection engine 526 inspects the value of the neighboring points of (or points that are adjacent to) the query point within the occupancy map frame 522. If the value of any neighboring points of (or points that are adjacent to) the query point in the occupancy map frame 522 is zero, the query point is identified as a boundary point.

When the smoothing engine 528 performs color smoothing at step 576, the color of points near patch boundaries are smoothed. In certain embodiments, the smoothing engine 528 identifies a small neighborhood of points around each query point. The smoothing engine 528 computes the centroid of the points in the neighborhood. Thereafter, the smoothing engine 528 modifies the position of the query point with the centroid of the neighborhood if the distance between the centroid and the query point is larger than a threshold. That is, this method replaces the query point with the centroid of the neighborhood if the position of the query point is significantly different from the neighborhood. As such, a smoother surface will be generated at patch boundaries.

In the above example, the centroid of the neighborhood can be based on a distance between the centroid and the query point. However, identifying the neighborhood for each boundary point can use significant computational bandwidth and processing power. In order to reduce the complexity when the centroid of the neighborhood of a query point is identified, all the boundary points within a small distance from the query point in the neighborhood can be compared against the centroid. By identifying boundary points within a small distance from the query point in the neighborhood there is no need to identify the neighborhood of boundary points which are already smoothed. As such, the amount of computation is significantly reduced.

In certain embodiments, a centroid of a neighborhood can be used to smooth multiple boundary points. The boundary detection engine 526 first identifies a neighborhood around a query point. The smoothing engine 528 calculates the centroid of the neighborhood. The boundary detection engine 526 can identify boundary points a small distance from the query point. The smoothing engine 528 derives the distance between the selected boundary points from the centroid. When the distance for any boundary point is larger than a threshold, the smoothing engine 528 modifies the boundary point, by replacing the value of the boundary point with that of the centroid. However, when the distance for any boundary point is less than a threshold, the smoothing engine 528 does not replace the value of the boundary point. Any boundary point that is smoothed is excluded from further smoothing.

In certain embodiments, the smoothing engine 528 can also smooth geometry points that are represented in 2D frames, instead of a reconstructed 3D point cloud. Generally, the point cloud 512 is clustered and projected onto XY, YZ, and XZ planes resulting in several patches. The patches are placed in video frames based on the size of their bounding box. As such, non-neighboring patches are often placed next to each other in the same frame. The smoothing engine 528 can identify patches which are neighboring in 3D space. After identifying patches which are neighboring in 3D space, the smoothing engine 528 smoothest the neighboring boundary points. For example, the boundary detection engine 526 identifies a neighborhood around a query point. Then the smoothing engine 528 projects all of the neighboring points on the projection place of the query point. The smoothing engine 528 can derive the average depth of the neighboring points. After deriving the average depth of the neighboring points, the smoothing engine 528 derives the distance between the depth of the query point and the average depth in the neighborhood. The smoothing engine 528 modifies the depth value of the query point if the distance is larger than a threshold.

In certain embodiments, other filters such as median, second-order static filters can be used instead of average filters. In certain embodiments, neighborhood search can be performed in 2D space by searching on the boundary points in the neighboring patches.

When the smoothing engine 528 performs color smoothing at step 576, the color of points near patch boundaries are smoothed. First points near patch boundaries of the reconstructed point cloud are identified. Then the color values of the selected points in a small neighborhood are smoothed.

In certain embodiments, the boundary detection engine 526 identifies only identifies points that are located at patch boundaries. To do so, the boundary detection engine 526 selects a random point, identified as a query point. The boundary detection engine 526 determines whether the value, as indicated in the occupancy map frame 522, is zero (or invalid) for the query point. If the value is not zero for the query point then, the boundary detection engine 526 determines whether the value, as indicated in the occupancy map frame 522, is zero (or invalid) for any points that are adjacent to the query point. The query point is identified as a patch boundary point when any neighboring point that is adjacent to the query point is identified as zero (or invalid).

In certain embodiments, the boundary detection engine 526 identifies boundary points as points that are on a patch boundary and points that are adjacent to the points at the patch boundary.

In certain embodiments, the boundary detection engine 526 identifies boundary points as points that are on a patch boundary (as discussed in the above example) and points that are in the neighborhood of the points at the patch boundary. In certain embodiments, a neighborhood is identified as each point that is within a predefined distance a query point. For example, a predefined distance can be a number of pixels away from the query point. In certain embodiments, a neighborhood is identified for each point.

In certain embodiments, the boundary detection engine 526 can identify boundary points using a K-D tree search. For example, for a given query point, the boundary detection engine 526 can perform a K-D tree nearest neighbor search. After performing the K-D tree nearest neighbor search the boundary detection engine 526 can derive a distance from each neighboring point from the query point. After deriving the distance between each neighboring point from the query point, the boundary detection engine 526 can determine whether the distance is smaller than the radius of smoothing. If the distance is smaller than the radius of smoothing, the neighboring points are discarded. However, the distance is larger than the radius of smoothing, then the boundary detection engine 526 can determine whether the distance of a neighboring point from the query point is smaller than the radius of boundary detection and the neighboring point is located in other partitions from the query point. If (i) distance of a neighboring point from the query point is larger than the radius of boundary detection, or (ii) the neighboring point is located in other partitions from the query point, then the boundary detection engine 526 discards the query point. However, if (i) distance of a neighboring point from the query point is smaller than the radius of boundary detection, and (ii) the neighboring point is located in other partitions from the query point, then the boundary detection engine 526 identifies and classifies the query point as a boundary point.

Once the points near patch boundaries are identified, the smoothing engine 528 performs color smoothing for the identified boundary points. As discussed above, the identified boundary points can include points that are positioned on boundary between patches as well as points that are within a neighborhood of a boundary point.

In certain embodiments, the smoothing engine 528 finds a small neighborhood around each query point. The smoothing engine 528 derives a median of color of the points in the neighborhood. Thereafter, the smoothing engine modifies the color component of the query point by replacing the color component of the query point with the median values of the color component in the neighborhood. By using the median value, of the color components, the effect of the points with highly distorted color would be drastically reduced, based on the statistics of the neighborhood.

In certain embodiments, the smoothing engine 528 identifies a large neighborhood around a query point. The smoothing engine 528 derives the median value of the luminance value of the selected neighborhood. The median value can be used as a reference luminance. The smoothing engine 528 can then identify a small neighborhood around the same query point. The smoothing engine 528 then compares the luminance of each point in the small neighborhood against the reference luminance. The smoothing engine 528 can exclude any point from smoothing when the difference between the points luminance value and the reference luminance value is larger than a threshold. The smoothing engine 528 can then derive the average value for each color component for the remaining points in the small neighborhood. The smoothing engine 528 then modifies the color values of the query point by replacing the color values of the query point with the average values from the derived average value for each color component for the remaining points in the small neighborhood.

In certain embodiments, the smoothing engine 528 smooths boundary points regardless of local characteristics of the point cloud near patch boundaries. For example, visual artifacts can be easily seen in regions of a point cloud that are smooth, such as less textured. As such, the smoothing engine 528 takes into account local characteristics of the point cloud. The smoothing engine 528 can perform less color smoothing when the area is highly textured and more color smoothing when the area is less textured. For example, the smoothing engine 528 identifies a large neighborhood around a query point. The size of the neighborhood can be predefined. The smoothing engine 528 derives the average and standard deviation of each color in the large neighborhood. The smoothing engine 528 first compares the average value of each color component against the corresponding standard deviation in the large neighborhood. If the ratio of the standard deviation to the average value for any color component is larger than a threshold, the smoothing engine 528 performs no color smoothing on the query point, since the neighbored texture is not smooth.

If the ratio of the standard deviation to the average value for any color component is less than a threshold, the smoothing engine 528 determines whether the ratio of the value of each color component of the query point and the standard deviation of the same color point in the large neighborhood is less than a threshold. When the ratio of the value of each color component of the query point and the standard deviation of the same color point in the large neighborhood is less than a threshold, the smoothing engine 528 performs no color smoothing on the query point since the query point is similar to its neighbors.

When the ratio of the value of each color component of the query point and the standard deviation of the same color point in the large neighborhood is greater than a threshold, the smoothing engine 528 identifies a small neighborhood around the query point. The smoothing engine 528 derives a centroid of the color points in the small neighborhood. After deriving the centroid of the color points in the small neighborhood, the smoothing engine 528 determines whether the distance between the color of the query point and the centroid is larger than a threshold. When the distance between the color of the query point and the centroid is larger than a threshold, the smoothing engine 528 modifies the color of the query point by replacing the color of the query point with the centroid. Color smoothing in this nature does not smooth patch boundaries where the visual artifacts would be negligibly visible.

In certain embodiments, the smoothing engine 528 smooths color based on local entropy of the neighborhood of a query point. For example, when the local entropy is large indicates that the point cloud is highly textured. Conversely, when the local entropy is small indicates that the point cloud is not highly textured. When the local entropy is larger than a threshold, the smoothing engine 528 does not perform smoothing with respect to the query point.

For instance, the smoothing engine 528 derives the local entropy in the neighborhood around a query point. The smoothing engine 528 compares the local entropy against a threshold. When the local entropy is greater than the threshold, no color smoothing is performed since the point cloud is highly textured. In contrast, when the local entropy is less than the threshold, the smoothing engine 528 derives the centroid of the color or points in the neighborhood. After deriving the centroid of the color or points in the neighborhood, the smoothing engine 528 determines whether the distance between the color of the query point and the centroid is larger than a threshold. When the distance between the color of the query point and the centroid is larger than a threshold, the smoothing engine 528 modifies the color of the query point by replacing the color of the query point with the centroid.

The local entropy can be derived using luminance of the points in the neighborhood. The local entropy can be derived using any color component. The local entropy can be derived using off color components. In certain embodiments, local entropy can be derived for a query point and the same value can be used for a group of neighboring query points.

In certain embodiments, texture can be characterized based on the average of the absolute differences of the luminance of the points in the neighborhood. If the local texture is smooth, a small value is derived. For instance, the smoothing engine 528 derives the absolute difference of the point luminance in the neighborhood around a query point. Alternatively, the smoothing engine 528 derives the absolute difference of the color component in the neighborhood around a query point. The smoothing engine 528 then compares the absolute difference (of the point luminance or the color component) against a threshold. When the absolute difference (of the point luminance or the color component) is less than the threshold, the smoothing engine derives the centroid of the color of points in the neighborhood. When the distance between the color of the query point and the centroid is larger than a threshold, the smoothing engine 528 modifies the color of the query point by replacing the color of the query point with the centroid. The smoothing engine can derive the average of the absolute difference from the color components of the points In step 578, the patch generator 514 and the frame packing 516 generate the texture frames. In step 580, the encoding engine 524 performs video encoding to the geometry frames, the texture frames and the occupancy map frames. After encoding, a bitstream 536 is generated and transmitted to another device, such as the decoder 550.

Although FIG. 5D illustrates one example of a process for performing smoothing, various changes may be made to FIG. 5D. For example, while shown as a series of steps, various steps in FIG. 5D could overlap, occur in parallel, or occur any number of times.

Figure 6:
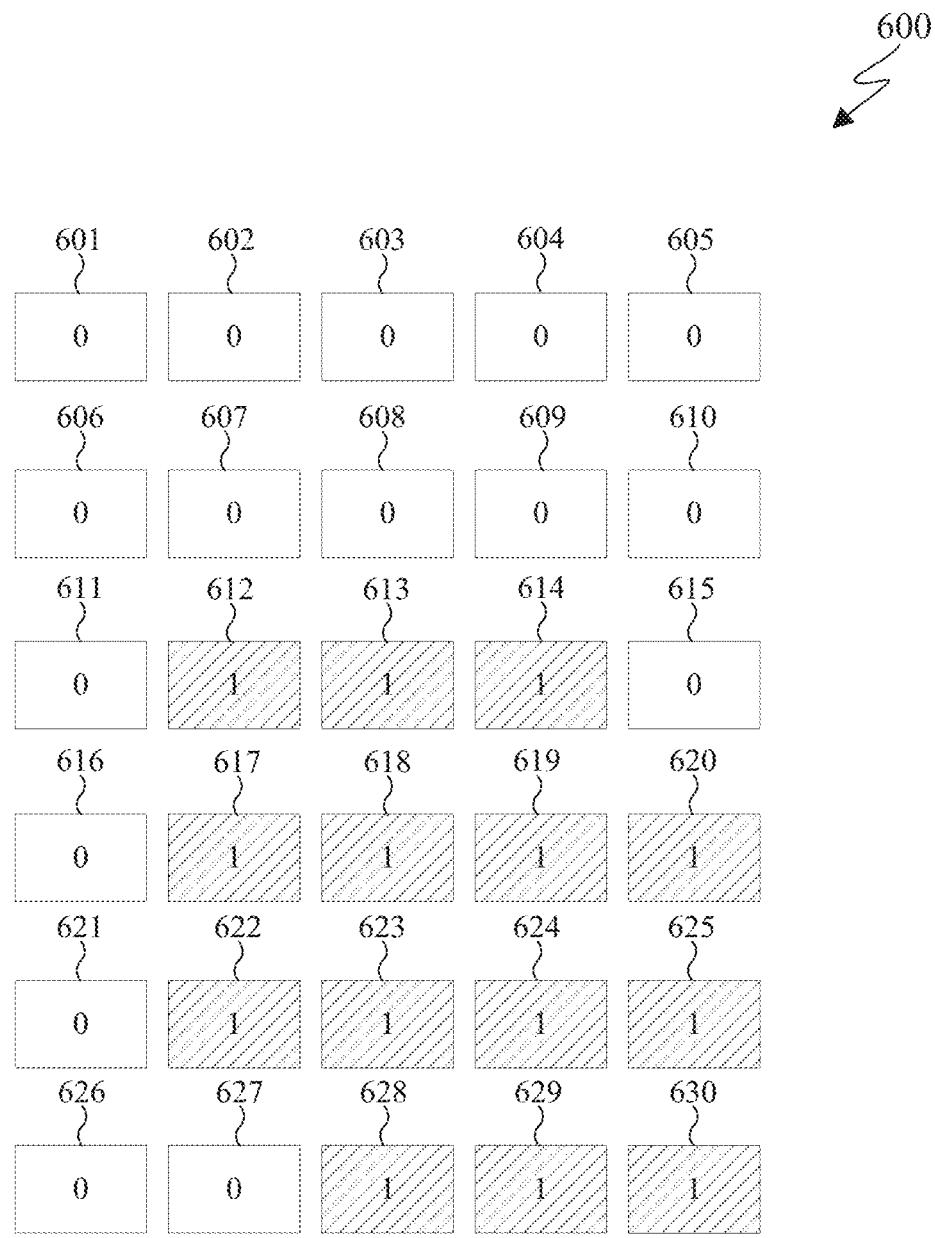
FIG. 6 illustrates an example portion of an occupancy map in accordance with an embodiment of this disclosure.

FIG. 6 illustrates an example portion of an occupancy map 600 in accordance with an embodiment of this disclosure. The portion of the occupancy map 600 includes pixels 601-630. The pixels are for illustration only. Other embodiments can be used without departing from the scope of this disclosure. As shown here, the pixels 601-630 can be included in an occupancy map frame, such as the occupancy map frame 522 of FIG. 5B. The occupancy map 600 can correspond to the geometry frame 410 of FIG. 4B, the texture frame 420 of FIG. 4C, the geometry frame 518, and the texture frame 520 of FIG. 5B.

The pixels 601-630 represent pixels in a frame that include both valid points and invalid points. The pixels 601-630 each include a value, such as a one or a zero. As shown in FIG. 6, a value of zero indicates an invalid pixel, while a value of one is associated with a valid pixel. For example, pixels 612, 613, 614, 617, 618, 619, 620, 622, 623, 624, 625, 628, 629, and 630 represent a portion of a patch, while pixels 601-611, 615, 616, 621, 626, and 627 are invalid pixels and represent a blank space on one of the frames.

The boundary detection engine 526 of FIGS. 5B and 5C performs boundary detection of patches in a frame. For example, the boundary detection engine 526 identifies a boundary between a valid pixel and an invalid pixel. In another example, the boundary detection engine 526 can identify neighboring points of a boundary point. The boundary detection engine 526 can perform multiple passes of the frame to identify boundaries between valid pixels and invalid pixels.

For example, the boundary detection engine 526 can inspect the pixel 601. The pixel 601 includes a zero value as indicated by the occupancy map, which indicates that the pixel 601 is an invalid point. Therefore, the boundary detection engine 526 continues to scan the frame. The boundary detection engine 526 can inspect the pixel 602, and determine that pixel 602 is also an invalid point since the pixel 602 includes a zero value.

In certain embodiments, the boundary detection engine 526 can scan the entire frame and flag each valid pixel. After identifying valid pixels, the boundary detection engine 526 can identify boundary pixels based on whether a valid pixel is adjacent to an invalid pixel. In certain embodiments, the boundary detection engine 526 can identify boundary pixels based on whether a valid pixel is within a predefined distance (within the neighborhood) from an invalid pixel.

In other embodiments, the boundary detection engine 526 inspects each individual pixel at a time to determine whether the pixel is valid or invalid. Upon identifying a valid pixel, the boundary detection engine 526 can determine whether the pixel is a boundary pixel based on whether the valid pixel is adjacent to an invalid pixel or within a predefined distance (within the neighborhood) from an involute pixel.

The pixel 612 includes a value of one as indicated by the occupancy map 600. Since the value of the pixel 612 is one, the boundary detection engine 526 determines that the pixel 612 is a valid pixel. When the boundary detection engine 526 inspects the pixel 612, and identifies that the pixel 612 is a valid pixel, the boundary detection engine 526 identifies whether any pixels that are adjacent to the pixel 612 are invalid. The eight adjacent pixels are the pixel 606, 607, 608, 611, 613, 616, 617, and 618. The eight adjacent pixels include both values of one and values of zero as indicated by the occupancy map. Since some of the pixels are valid pixels (the pixels with the value of one) and other pixels are invalid pixels (the pixels with the value of zero), the boundary detection engine 526 classifies the pixel 612 as a boundary pixel.

The pixel 618 includes a value of one as indicated by the occupancy map 600. Since the value of the pixel 618 is one, the boundary detection engine 526 determines that the pixel 618 is a valid pixel. When the boundary detection engine 526 inspects pixel 618, and identifies that the pixel 618 is a valid pixel, the boundary detection engine 526 identifies whether any of the adjacent pixels are invalid. The adjacent pixels are the pixel 612, 613, 614, 617, 619, 622, 623, and 624. The eight adjacent pixels all include a value of one (as indicated by the occupancy map), which indicates that the eight adjacent pixels are valid pixels. Since none of the adjacent pixels to the pixel 618 are invalid, the boundary detection engine 526 can determine that the pixel 618 is not a boundary pixel.

In certain embodiments, the boundary detection engine 526 can search for pixels that are invalid within a predefined area or neighborhood of a valid pixel. When the boundary detection engine 526 inspects pixel 618, and identifies that the pixel 618 is a valid pixel, the boundary detection engine 526 identifies whether any pixels within a predefined distance from the pixel 618 are invalid. The predefined distance can be a radius, a number of adjacent pixels or the like. When the predefined distance is a two pixel away, the boundary detection engine 526 identifies whether any pixels that are two pixels away from the pixel 618 are invalid. For example, the adjacent pixels to the pixel 618 are the pixel 612, 613, 614, 617, 619, 622, 623, and 624. When the boundary detection engine 526 inspects pixel 624, the boundary detection engine 526 identifies that each pixel adjacent to the pixel 624 is valid, and not a boundary point. However, when the boundary detection engine 526 inspects pixels 612, 614, 617, 619, 622, and 623 (other pixels that are adjacent to the pixel 618), the boundary detection engine 526 identifies that an adjacent pixel to each of these pixels is invalid. As such, each of the pixels 612, 614, 617, 619, 622, and 623 and the pixel 618 can be identified as a boundary pixel.

Although FIG. 6 illustrates one example of pixels on a frame, various changes can be made to FIG. 6. For example, any number of pixels can be included in the portion of the occupancy map 600, and any of the pixels can be valid or invalid points on the frame. In another example, the boundary detection engine 526 can identify boundary pixels in 3D space, such as when the 3D point cloud is reconstructed rather than on a 2D frame, such as the occupancy map 600.

Figure 7A:
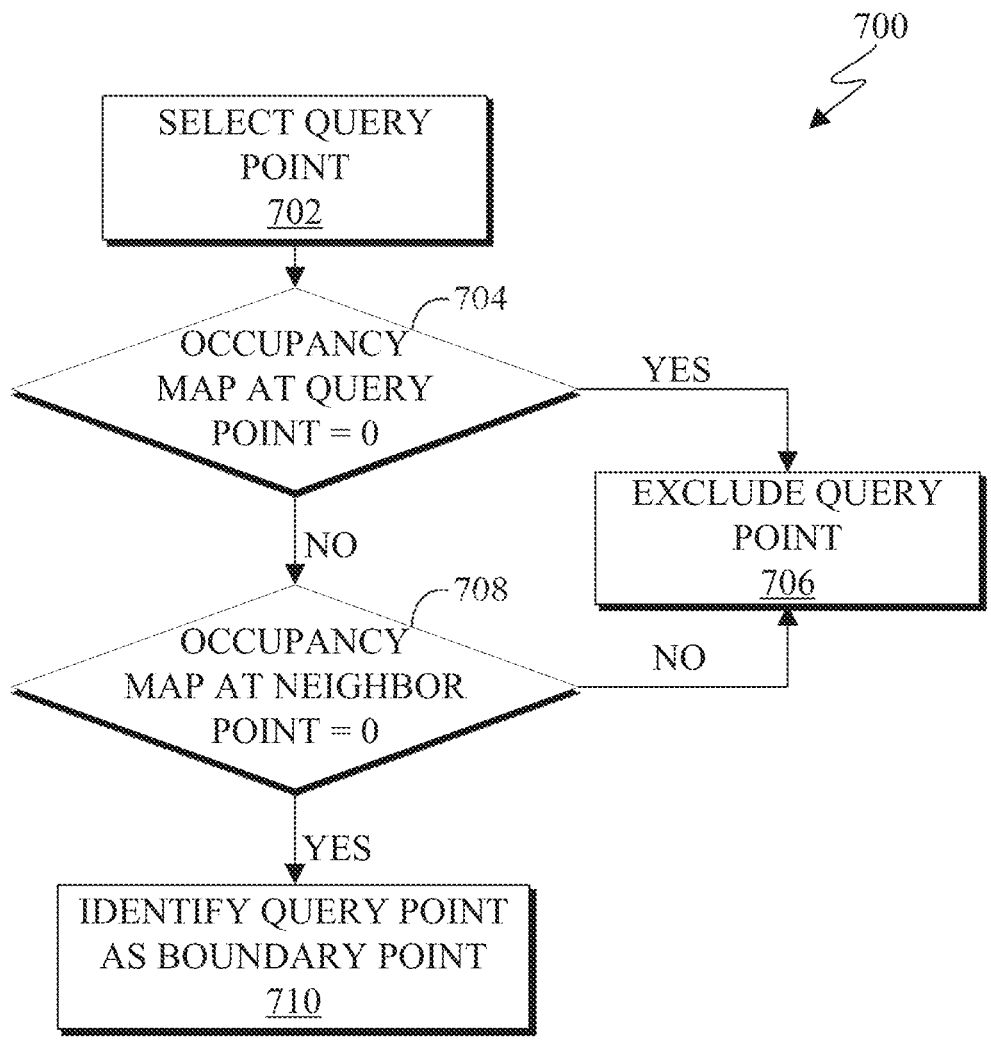
FIGS. 7A, 7B, and 7C illustrate example methods for identifying boundary points in accordance with an embodiment of this disclosure.
Figure 7B:
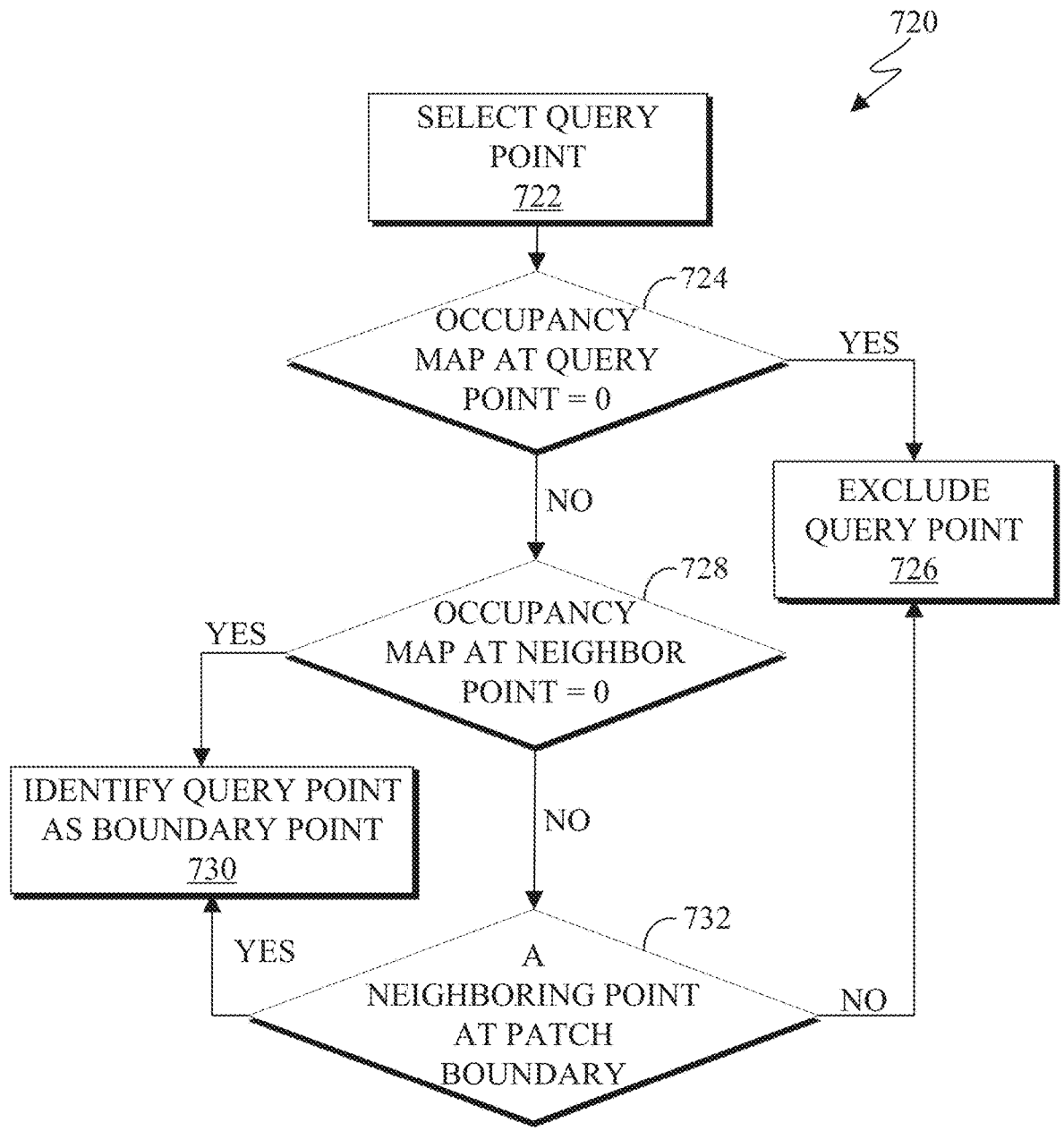
Figure 7C:
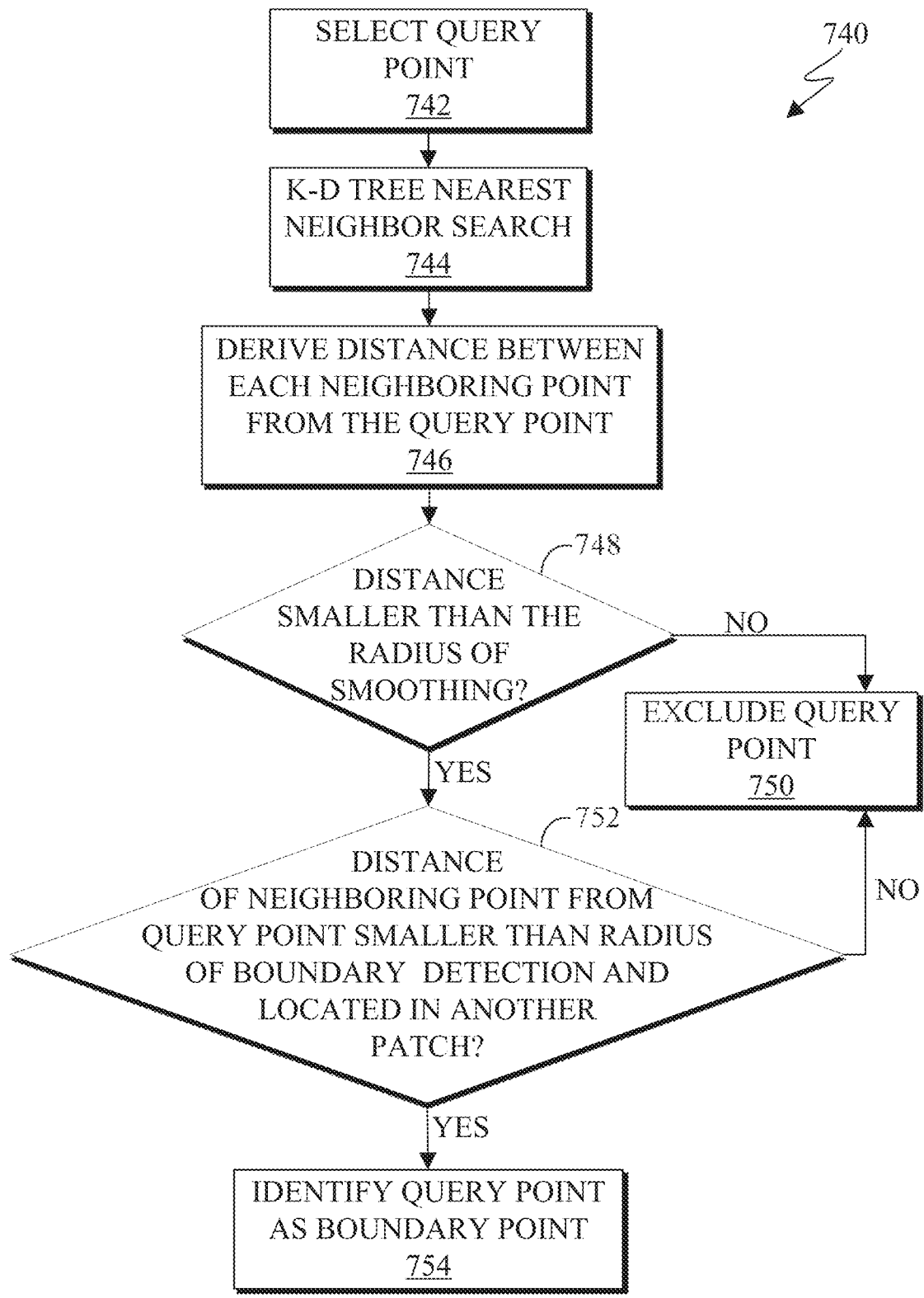

FIGS. 7A, 7B, and 7C illustrate example method for identifying boundary points in accordance with an embodiment of this disclosure. The methods of FIGS. 7A, 7B, and 7C can be performed by the sever 104 or any of the client devices 106-116 of FIG. 1, the server 200 of FIG. 2, the electronic device 300 of FIG. 3, the encoder 510 of FIGS. 5A and 5B, the process 501 of FIG. 5D, the decoder 550 of FIGS. 5A and 5C, or any other suitable device or system. For ease of explanation, the methods FIGS. 7A, 7B, and 7C are described as being performed by the boundary detection engine 526 of FIGS. 5B and 5C.

FIG. 7A illustrates an example method 700 for classifying a query point as a boundary point. In step 702, the boundary detection engine 526 selects a query point. The boundary detection engine 526 selects query point to determine whether the query point is a boundary point. When the query point is a boundary point smoothing may occur to the point. When the query point is not a boundary point, no smoothing will with respect to the point. The boundary detection engine 526 can parse each point in an occupancy map frame, such as the occupancy map frames 522 of FIG. 5B. For each boundary point that is identified, the point can be tagged for later processing. The boundary detection engine 526 can identify boundary points in a reconstructed point cloud using the occupancy map frames 522 of FIG. 5B.

In step 704, the boundary detection engine 526 determines whether the selected query point is set zero in the occupancy map. A pixel that is set to zero in the occupancy map indicates that the pixel is invalid; while a pixel that is set to one in the occupancy map indicates that the pixel is valid. When the boundary detection engine 526 determines that the selected query point is set zero in the occupancy map, the selected query point is identified as an invalid pixel and as such excluded from further processing. When the query point is an invalid point the query point is excluded, and another query point is selected in step 702 or further processing is performed with respect to any identified boundary points.

When the selected query point is not set to zero (the query point is a valid point in the point cloud) in the occupancy map, the boundary detection engine 526, in step 708 determines whether a neighboring point of the query point is set to zero in the occupancy map. The neighboring point can be a pixel that is adjacent to the query point on a 2D frame. The neighboring point can be a point in 3D space that is adjacent to the query point. The neighboring point can be a point a predefined distance away from the query point in a 2D frame or in 3D space.

When a neighboring point of the query point is not set to zero in the occupancy map, the boundary detection engine 526 determines that the neighboring point and the query point are both valid points. In step 706, when the neighboring point and the query point are both valid points, the query point is excluded, and another query point is selected in step 702 or further processing is performed with respect to any identified boundary points.

When a neighboring point of the query point is set to zero in the occupancy map, in step 710, the boundary detection engine 526 determines that the query point is a boundary point. The query point is identified as a boundary point since it corresponds to a valid point and one of its neighbors is an invalid point. After identifying a boundary point, the boundary detection engine 526 can search for additional boundary points or finish searching for boundary point.

FIG. 7B illustrates an example method 720 for classifying a query point and neighboring points of the query point as a boundary point. In step 722, the boundary detection engine 526 selects a query point. The boundary detection engine 526 selects query point to determine whether the query point is a boundary point. When the query point is a boundary point smoothing may occur to the point. When the query point is not a boundary point, no smoothing will occur with respect to the point. The boundary detection engine 526 can parse each point in an occupancy map frame, such as the occupancy map frames 522 of FIG. 5B. For each boundary point that is identified, the point can be tagged for later processing. The boundary detection engine 526 can identify boundary points in a reconstructed point cloud using the occupancy map frames 522 of FIG. 5B.

In step 724, the boundary detection engine 526 determines whether the selected query point is set zero in the occupancy map. A pixel that is set to zero in the occupancy map indicates that the pixel is invalid; while a pixel that is set to one in the occupancy map indicates that the pixel is valid. When the boundary detection engine 526 determines that the selected query point is set zero in the occupancy map, the selected query point is identified as an invalid pixel and as such excluded from further processing, such as smoothing. When the query point is an invalid point the query point is excluded, and another query point is selected in step 722 or further processing is performed with respect to any identified boundary points.

When the selected query point is not set to zero (the query point is a valid point in the point cloud) in the occupancy map, in step 728, the boundary detection engine 526 determines whether a neighboring point of the query point is set to zero in the occupancy map. The neighboring point can be a pixel that is adjacent to the query point on a 2D frame. The neighboring point can be a point in 3D space that is adjacent to the query point. The neighboring point can be a point a predefined distance away from the query point in a 2D frame or in 3D space.

When a neighboring point of the query point is set to zero in the occupancy map, in step 730, the boundary detection engine 526 determines that the query point is a boundary point. The query point is identified as a boundary point since it corresponds to a valid point and one of its neighbors is an invalid point.

In step 732, when a neighboring point of the query point is not set to zero in the occupancy map frame, the boundary detection engine 526 determines whether a neighboring point is at a patch boundary. If the neighboring point is not at a patch boundary, then the query point is excluded, and another query point is selected in step 702 or further processing is performed with respect to any identified boundary points.

Alternatively, in step 730, if the neighboring point is located at a patch boundary, then the query point is identified as a boundary point. After identifying a boundary point, the boundary detection engine 526 can search for additional boundary points or finish searching for boundary point.

FIG. 7C illustrates an example method 740 for classifying a query point as a boundary point. In step 742, the boundary detection engine 526 selects a query point. The boundary detection engine 526 selects query point to determine whether the query point is a boundary point. When the query point is a boundary point smoothing may occur to the point. When the query point is not a boundary point, no smoothing will with respect to the point. The boundary detection engine 526 can parse each point in an occupancy map frame, such as the occupancy map frames 522 of FIG. 5B. For each boundary point that is identified, the point can be tagged for later processing. The boundary detection engine 526 can identify boundary points in a reconstructed point cloud using the occupancy map frames 522 of FIG. 5B.

In step 744, the boundary detection engine 526 performs a K-D tree nearest neighbor search with respect to the query point. In step 746, the boundary detection engine 526 derives the distance between each neighboring point and the query point.

In step 746, the boundary detection engine 526 determines whether the derived distance between each neighboring point and the query point is smaller than a first threshold. The first threshold can be a predefined radius of smoothing. If the distance between the query point and a neighboring point is larger than the first threshold, then in step 750, the boundary detection engine 526 discards the neighboring point.

If the distance between the query point and a neighboring point is smaller than the first threshold, then in step 752, the boundary detection engine 526 determines whether the distance of a neighboring point from the query point is smaller than a second threshold as well as determining whether the neighboring point is located in another patch within the 2D frame. The second threshold is based on the radius of boundary detection.

In step 754, the query point is identified as a boundary point when the distance between the query point and a neighboring point is smaller than the second threshold and the neighboring point is located in another patch. Alternatively, if the distance between the query point and a neighboring point is larger than the second threshold and the neighboring point is located in another patch the query point is excluded in step 750. After identifying a boundary point, the boundary detection engine 526 can search for additional boundary points or finish searching for boundary point.

Although FIGS. 7A, 7B, and 7C illustrates one example of pixels on a frame, various changes can be made to FIGS. 7A, 7B, and 7C. For example, while shown as a series of steps, various steps in FIGS. 7A, 7B, and 7C could overlap, occur in parallel, or occur any number of times. In another example, the boundary detection engine 526 can identify boundary points using other methods.

FIGS. 8A, 8B, and 8C illustrate example method for color smoothing in accordance with an embodiment of this disclosure. The methods of FIGS. 8A, 8B, and 8C can be performed by the sever 104 or any of the client devices 106-116 of FIG. 1, the server 200 of FIG. 2, the electronic device 300 of FIG. 3, the encoder 510 of FIGS. 5A and 5B, the process 501 of FIG. 5D, or any other suitable device or system. For ease of explanation, the methods FIGS. 8A, 8B, and 8C are described as being performed by the smoothing engine 528 of FIG. 5B.

FIG. 8A illustrates the method 800 for color smoothing. In step 802 a boundary point is selected. The boundary point can be a query point that is classified or identified as a boundary point as discussed above in FIGS. 7A, 7B, and 7C. For example, the boundary point can be a boundary pixel such as the pixel 612 of FIG. 6.

In step 804, the color smoothing engine 528 identifies a neighborhood around each identified boundary point. The neighborhood can be a predefined number of points or pixels away from the identified boundary point. In certain embodiments, the color smoothing engine 528 identifies a nearest neighbor of the boundary point.

In step 806, the color smoothing engine 528 derives the median of the color points in the identified neighborhood. After deriving the median of the color points, in step 808 the color smoothing engine 528 can perform smoothing on selected boundary point. For example, the smoothing engine 528 modifies the color values of the boundary point by replacing the color values of the boundary point with the median values of the color components in the neighborhood. In certain embodiments, after smoothing the color of the query point, additional boundary points can be smoothed.

FIG. 8B illustrates the method 810 for color smoothing. In step 812, a neighborhood of a query point is identified. The query point was previously identified as a boundary point. The query point can be a boundary point that is classified or identified as a boundary point as discussed above in FIGS. 7A, 7B, and 7C.

The boundary detection engine 526 identifies a neighborhood of pixels around a query point. The query point can be a boundary pixel such as the pixel 612 of FIG. 6, and the neighborhood of pixels includes both boundary points and neighboring points of the query pixel. For example, the neighborhood, of pixels, of one level deep, around the pixel 612 can include the pixel 618. In another example, the neighborhood, of pixels, of two levels deep, around the pixel 612 can include the pixels 618 and 624. In certain embodiments, the neighborhood around the query point can be identified using a K-D tree nearest search.

In step 814, the smoothing engine 528 derives the local entropy for the neighborhood of pixels. In certain embodiments, entropy is based on the luminance of the pixels within the neighborhood. In other embodiments, entropy is based on the color components of the valid pixels within the neighborhood.

In step 816, the smoothing engine 528 determines whether the entropy of the neighborhood of pixels is smaller than a threshold. If the entropy of the neighborhood of pixels is larger than the threshold, then in step 818 the query point is not smoothed. If the no smoothing is to be performed, the smoothing engine 528 can identify another query point in step 812.

If the local entropy of the boundary points is smaller than the threshold, then in step 820, the smoothing engine 528 derives the centroid of the color points of the boundary points that were identified in step 812. The centroid represents the average value of each color component of the boundary points. For example, the centroid includes an average of the red color values, an average of the blue color values, and an average of the green color values of the boundary points.

In step 822 the smoothing engine 528 determines whether the difference between color values of the centroid and the color value of the query point is larger than a second threshold. If the difference between color values of the centroid and the color value of the query point is smaller than the second threshold then in step 818 the boundary points are not smoothed. If the difference between color values of the centroid and the color value of the query point is larger than a second threshold, then in step 824, the smoothing engine 528 performs color smoothing. For example, the smoothing engine 528 modifies the color values of the boundary points by replacing the color values of the boundary points with the color values of the centroid. In certain embodiments, after smoothing the color of the query point, additional boundary points can be smoothed.

FIG. 8C illustrates the method 830 for color smoothing. The method 830 is similar to the method 810. For example, the method 810 the smoothing is based on the local entropy, while in method 830 the smoothing is based on the absolute difference of luminance. The method 830 utilizes the absolute difference of luminance of points in the neighborhood to characterize the local texture of the point cloud. Both method 810 and the method 830 perform smoothing of the point cloud based on the texture of the area of an identified boundary point.

In step 832 a neighborhood of a query point that is identified as a boundary point is identified. The boundary point can be a query point that is classified or identified as a boundary point as discussed above in FIGS. 7A, 7B, and 7C. The boundary detection engine 526 identifies a neighborhood of pixels around a query point. The query point can be a boundary pixel such as the pixel 612 of FIG. 6, and the neighborhood of pixels includes both boundary points and neighboring points of the query pixel. For example, the neighborhood, of pixels, of one level deep, around the pixel 612 can include the pixel 618. In another example, the neighborhood, of pixels, of two levels deep, around the pixel 612 can include the pixels 618 and 624. In certain embodiments, the neighborhood around the query point can be identified using a K-D tree nearest search.

In step 834, the smoothing engine 528 derives the average absolute difference in the neighborhood. In certain embodiments, average absolute difference is based on the luminance of the pixels within the neighborhood.

In step 836, the smoothing engine 528 determines whether the average absolute difference of the neighborhood points is smaller than a threshold. If the average absolute difference of the neighborhood points is larger than the threshold, then in step 838 the query point is not smoothed. If the no smoothing is to be performed, the smoothing engine 528 can identify another query point in step 812.

If the average absolute difference of the neighborhood points is smaller than the threshold, then in step 840, the smoothing engine 528 derives the centroid representing the average of each color component of the neighborhood points. For example, the centroid includes an average of the red color values, an average of the blue color values, and an average of the green color values of the boundary points.

In step 822 the smoothing engine 528 determines whether the difference between color values of the centroid and the color value of the query point is larger than a second threshold. If the difference between color values of the centroid and the color value of the query point is smaller than the second threshold then in step 838 the boundary points are not smoothed. If the difference between color values of the centroid and the color value of the query point is larger than a second threshold, then in step 844, the smoothing engine 528 performs color smoothing. For example, the smoothing engine 528 modifies the color values of the query point by replacing the color values of the query point with the color values of the centroid. In certain embodiments, after smoothing the color of the query point, additional boundary points can be smoothed.

Although FIGS. 8A, 8B, and 8C illustrates one example of pixels on a frame, various changes can be made to FIGS. 8A, 8B, and 8C. For example, while shown as a series of steps, various steps in FIGS. 8A, 8B, and 8C could overlap, occur in parallel, or occur any number of times. In another example, the smoothing engine 528 can smooth the color of points using other methods.

FIGS. 9A, 9B, and 9C illustrate example methods for geometry smoothing in accordance with an embodiment of this disclosure. The methods of FIGS. 9A, 9B, and 9C can be performed by the sever 104 or any of the client devices 106-116 of FIG. 1, the server 200 of FIG. 2, the electronic device 300 of FIG. 3, the encoder 510 of FIGS. 5A and 5B, the process 501 of FIG. 5D, the decoder 550 of FIGS. 5A and 5C, or any other suitable device or system. For ease of explanation, the methods FIGS. 9A, 9B, and 9C are described as being performed by the smoothing engine 528 of FIGS. 5B and 5C.

FIG. 9A illustrates method 900 for geometry smoothing. In step 902 a neighborhood of a query point is identified. For example, the query point was previously identified as a boundary point. The query point can be a boundary point that is classified or identified as a boundary point as discussed above in FIGS. 7A, 7B, and 7C.

The boundary detection engine 526 identifies a neighborhood of pixels around a query point. The query point can be a boundary pixel such as the pixel 612 of FIG. 6, and the neighborhood of pixels includes both boundary points and neighboring points of the query pixel. For example, if the query point is 612, then the neighborhood of pixels that is of one level deep can include the pixel 618. In another example, if the query point is 612, then the neighborhood of pixels that is two levels deep can include the pixels 618 and 624.

In step 904, the smoothing engine 528 derives a centroid of the points in the neighborhood. In certain embodiments, the smoothing engine 528 can use a filter instead of deriving the centroid. The filter can include a bilateral filter, a second-order statistic filter, and the like.

In step 906, the smoothing engine 528 determines whether the distance between the query point and the centroid is larger than a threshold. For example, smoothing engine 528 determines whether the perform smoothing based on whether the difference between the centroid value and the geometry value of the query point. In certain embodiments, the distance represents the difference between the geometry value of the query point and the value of the centroid.

In step 908, the smoothing engine 528 does not perform smoothing on the query point when the distance between the query point and the centroid is larger than a threshold. In Step 910, when the distance between the query point and the centroid is larger than a threshold, the smoothing engine 528 performs geometry smoothing on query point. For example, the smoothing engine 528 modifies the position information of the query point by replacing the position information of the query point with the centroid of the neighborhood.

In certain embodiments, the encoder 510 can also identify neighboring points of the query point, and then, if needed, smooth the geometry values for each of the neighboring points and the query point. For example, the encoder 510 determines whether one of the neighboring points of the query point is also identified as a boundary point. For instance, the boundary detection engine 526 inspects each neighboring point to determine whether to classify a point as a boundary point. When a neighboring point of the query point is a boundary point, in step 904, the encoder 510 derives a centroid representing the geometry value of all of the neighboring points. Similar to the step 906, the encoder 510 compares the centroid with each neighboring point that is identified as a boundary point, as well as the query point, since the query point was previously identified as a boundary point. The encoder 510 determines whether to modify a geometry value of any of the boundary points as well as the query point. The encoder 510 will modify each boundary point (including the query point), when the difference between the centroid and a respective geometry value is larger than a threshold. For example, if there are five points identified as a boundary point, including the query point, the encoder 510 compares the geometry value of each boundary point to the centroid. The encoder 510 modifies only the boundary points whose geometry value when compared to the centroid is larger than a threshold. That is, the encoder 510 can modify any number of the points, based on the comparison. After smoothing a point is smoothed, the point is tagged such that it will not undergo any additional geometry smoothing.

FIG. 9B illustrates method 920 for geometry smoothing. In step 922 a neighborhood of a query point is identified. The query point was previously identified as a boundary point. For example, the query point can be a boundary point that is classified or identified as a boundary point as discussed above in FIGS. 7A, 7B, and 7C.

The boundary detection engine 526 identifies a neighborhood of pixels around a query point. The query point can be a boundary pixel such as the pixel 612 of FIG. 6, and the neighborhood of pixels includes both boundary points and neighboring points of the query pixel. The size of the neighborhood can be predetermined, such as a number of pixels in proximity to the query point or a predefined distance from the query point.

In step 924, the boundary detection engine 526 identifies boundary points within a predefined distance from the query point. The neighborhood can be larger or the same as the predefined distance. For example, if the neighborhood is a first distance from the query point, the predefined distance from the query point is less than or equal to the first distance.

In step 926, the smoothing engine 528 derives a centroid of the points in the neighborhood. In certain embodiments, the smoothing engine 528 can use a filter instead of deriving the centroid. The filter can include a bilateral filter, a second-order statistic filter, and the like.

In step 928, the smoothing engine 528 determines whether the distance between the query point and the centroid is larger than a threshold as well as whether the distance between each of the identified boundary points within the predefined distance and the centroid is larger than a threshold. For example, the smoothing engine 528 can determine whether the difference between the geometry value of the query point and centroid value and is larger than a threshold. The smoothing engine can also determine whether the difference between the geometry value of each boundary point within the predefined distance and centroid value and is larger than a threshold.

In step 930, the smoothing engine 528 does not perform smoothing on the query point when the distance between the query point and the centroid is larger than a threshold. Similarly, the smoothing engine 528 determines whether the difference between the value of each boundary point is larger than a threshold. For each boundary point, the smoothing engine 528 does not perform any smoothing when the distance between a boundary point and the centroid is larger than a threshold.

In Step 932, when the distance between the query point and the centroid is larger than a threshold, the smoothing engine 528 performs geometry smoothing on query point. Similarly, when the distance between any boundary points (that is within the predefined distance) and the centroid is larger than a threshold, the smoothing engine 528 performs geometry smoothing on the respective boundary points. For example, the smoothing engine 528 modifies the position information of the query point and/or any boundary points (that are within the predefined distance) by replacing the position information of the query point and/or any boundary points with the value of the centroid.

FIG. 9C illustrates method 940 for geometry smoothing. The geometry smoothing of method 900 and 920 can be performed with respect to points in 3D space, while the geometry smoothing of method 940 is performed on 2D video frames. For example, patches in a 2D frame, such as a geometry frame 518 of FIG. 5B, that are neighboring in 3D space can be identified, even if the patches are not neighboring in the 2D frame. After identifying patches in a 2D frame that are neighbors in 3D space, the smoothing engine 528 smooths the geometry of the neighboring boundary points.

In step 942, a neighborhood of a query point is identified. For example, the query point can be previously identified as a boundary point. The query point can be a boundary point that is classified or identified as a boundary point as discussed above in FIGS. 7A, 7B, and 7C.

In step 944, the smoothing engine 528 projects all neighboring points on the projection plane of the query point. After all neighboring points are projected on the projection plane of the query point, the smoothing engine 528, in step 946, derives the average depth value of the projected points.

In step 948, the smoothing engine 528 derives the distance, such as the difference, between the depth value of the query point and the average depth value. For example, the smoothing engine 528 compares difference between the depth value of the query point to the average depth value to a threshold.

In step 950, when the difference between the depth value of the query point and the average depth value is less than a threshold, the smoothing engine 528 does not perform any smoothing with respect to the query point. In step 952, when the difference between the depth value of the query point and the average depth value is larger than a threshold, the smoothing engine 528 performs geometry smoothing with respect to the query point. For example, the smoothing engine 528 modifies the depth of the query point by replacing the depth of the query point with the average depth value of the neighborhood. In certain embodiments, after smoothing the geometry of the query point, additional equerry points are selected and potentially smoothed.

Although FIGS. 9A, 9B, and 9C illustrates one example of pixels on a frame, various changes can be made to FIGS. 9A, 9B, and 9C. For example, while shown as a series of steps, various steps in FIGS. 9A, 9B, and 9C could overlap, occur in parallel, or occur any number of times. In another example, the smoothing engine 528 can smooth the geometry of points using other methods.

Figure 10:
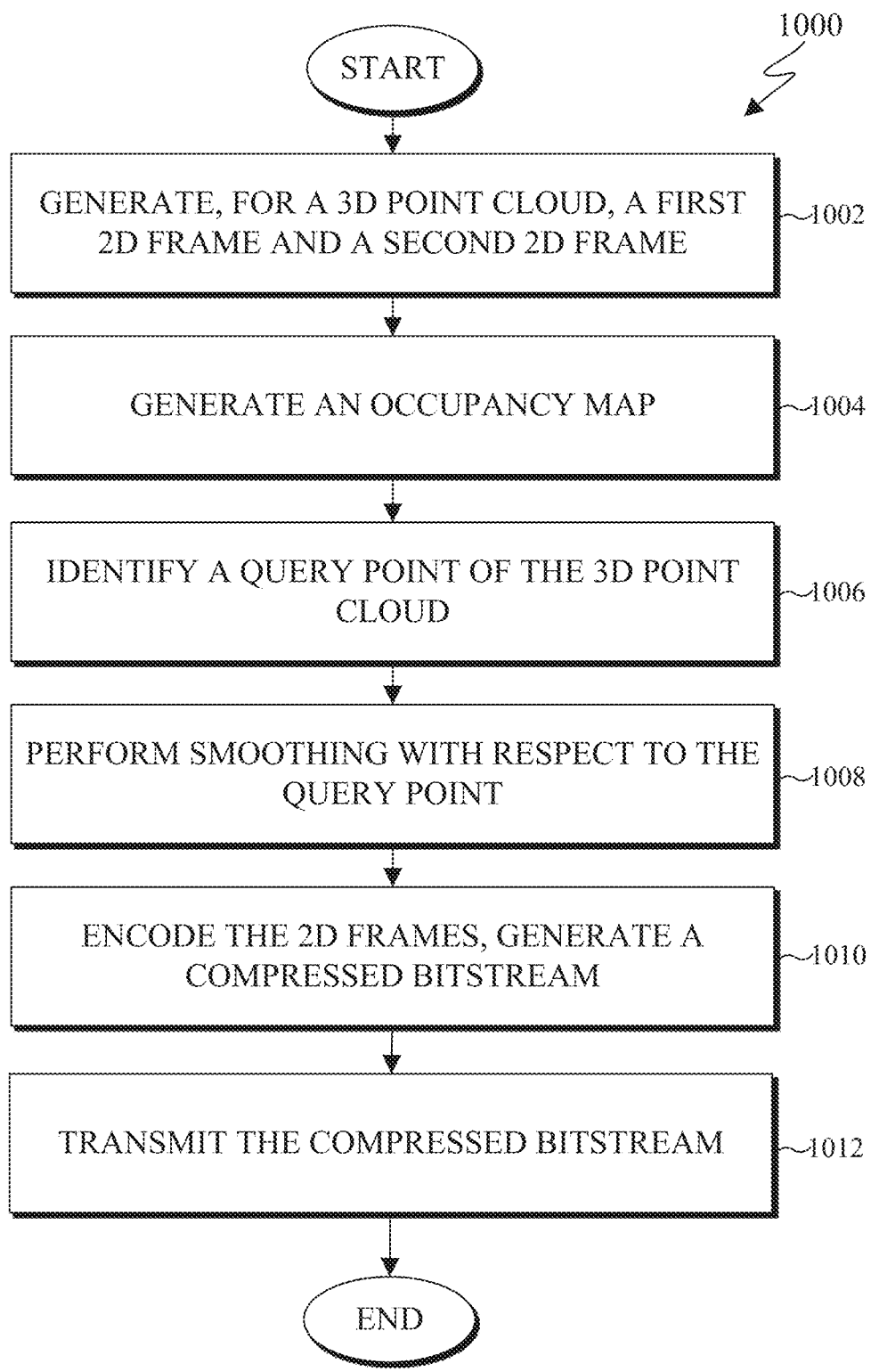
FIG. 10 illustrates an example method for encoding a point cloud in accordance with an embodiment of this disclosure.

FIG. 10 illustrates example method 1000 for encoding a point cloud in accordance with an embodiment of this disclosure. The method 1000 can be performed by the sever 104 or any of the client devices 106-116 of FIG. 1, the server 200 of FIG. 2, the electronic device 300 of FIG. 3, the encoder 510 of FIGS. 5A and 5B, the process 501 of FIG. 5D, or any other suitable device or system. For ease of explanation, the method 1000 is described as being performed by the encoder 510 of FIGS. 5A and 5B.

In step 1002, the encoder 510 generates 2D frames for a 3D point cloud. The 2D frames include a first frame and a second frame. The 2D frame can represent different attributes of the 3D point cloud. For example, the first frame can represent geometry while the second 2D frame can represent a texture, such as color.

The first and second frames can include patches. The patches represent clusters of points from the 3D point cloud. The projection of 3D points, from the 3D point cloud, onto the 2D frames create patches that store information that represent various attributes of the 3D point cloud. For example, in one frame the information can represent geometric positions of the points in 3D space, while additional frames can represent various textures, such as color, reflectiveness, and the like. There is a correspondence (or a mapping) between the patches in a frame that includes geometry information and each additional texture frame. For example, if the pixel location (i, j) within a patch in the geometry frame stores the geometry information (such as depth) of the kth point in the point cloud, then the color of the kth point is stored at pixel location (i, j) the associated color frame. A correspondence exists between each additional frame representing a different texture.

In certain embodiments, the encoder 510 can generate the frames at different time instances. For example, the encoder can generate the geometry frames, and then at a later time instance, generate the texture frames.

In step 1004, the encoder 510 generates an occupancy map. The occupancy map indicates pixels within a geometry frame, or a texture frame that correspond to the points of the 3D point cloud. For example, the occupancy map can indicate whether a pixel within the geometry frame is a valid pixel such that it corresponds to a valid point of the 3D point cloud or an invalid pixel such that the information stored for that pixel does not correspond to the 3D point cloud.

In step 1006, the encoder 510 identifies a query point. The query point is a point that is classified as a boundary point. The query point can be located on a boundary of a patch or a distance away from a boundary. The encoder 510 can identify the query point on one of the 2D frames. Alternatively, the encoder 510 can identify the query point as a point of the point cloud. For example, the encoder 510 can reconstruct the geometry of the 3D point cloud and based on correspondence information between a pixel on a 2D frame and a point of the 3D point, the encoder 510 can identify whether a particular query point is also a boundary point.

In certain embodiments, prior to generating the frame representing a texture and after encoding a frame representing geometry, the encoder can decode the geometry frame. After the frame representing geometry is decoded, the encoder 510 reconstructs the geometry attribute of the 3D point cloud. Due to the encoding and decoding of the frames, certain pixels can shift slightly creating visual artifacts that reduce the quality of the point cloud when it is reconstructed. To remove visual artifacts that reduce the quality of the point cloud, the second attribute, such as color can be applied to the reconstructed geometry points of the point cloud. After the color attribute is applied to the reconstructed geometry points of the point cloud, the encoder 510 can smooth the geometry attribute of certain points, the color attribute of certain points, or both the geometry and color attributes of certain points. After the smoothing process is complete, the encoder 510 then creates another frame that represents the color attribute. Creating a frame representing the color attribute of the point cloud after the geometric information of point cloud is encoded, decoded, and reconstructed, can increase the encoding efficiency, as well as reduce visual artifacts to improve the quality of the point cloud.

In step 1008, the encoder 510 performs smoothing to the query point. In certain embodiments, the smoothing is geometry smoothing. Geometry smoothing modifies a query point with respect to geometry information. In certain embodiments, the smoothing is color smoothing. Color smoothing modifies a query point with respect to color information. The encoder 510 can determine whether to smooth a query point or not smooth a query point.

When the smoothing is color, the encoder 510 can identify neighboring points within a distance from the query point. The encoder 510 then derive a local entropy value of the neighboring points and compares the local entropy value of the neighboring points to a first threshold. In certain embodiments, the local entropy can be based on the luminance of the neighboring points. In certain embodiments, the local entropy can be based on the color components of the neighboring points.

When the local entropy value is larger than the first threshold, indicates that the area includes lots of color changes and as such, a small number of pixels that are discolored would not affect the visual quality of the point cloud. Since a small number of pixels that are discolored in an area that includes a large local entropy (lots of color changes), the encoder does not smooth any color points.

Alternatively, when the local entropy value is equal to or smaller than the first threshold, indicates that the area is similar in color and as such, a small number of pixels that are discolored would affect the visual quality of the point cloud. Since a small number of pixels that are discolored would affect the visual quality of the point cloud, the encoder 510 derives a centroid representing color values of the neighboring points. The encoder 510 derives the color value of centroid by identifying the red color values, the green color values, and the blue color values for each neighboring points of the query point. The encoder 510 then averages the red color values, the green color values, and the blue color values to generate the centroid.

After deriving the centroid, the encoder 510 determines whether a difference between the centroid and a color value of the query point is larger than a second threshold. When the centroid and a color value of the query point is less than a second threshold indicates that the centroid value and the query point value are similar and no smoothing is needed since there would minimal affect with respect to the visual quality of the point cloud. Alternatively, when difference between the centroid and a color value of the query point is larger than a second threshold indicates that the query point is discolored and could affect the visual quality of the point cloud. To increase the visual quality of the point cloud, the encoder 510 performs color smoothing with respect to the query point. For example, the encoder 510 can modify the color value of the query point by replacing the color value of the query point with the color value of the centroid.

When the smoothing is geometry, the encoder 510 can identify neighboring points of the query point. The encoder 510 then derives a centroid representing a geometry value of the neighboring points. To derive the centroid representing a geometry value of the neighboring points the encoder 510 identifies the X-value the Y-value and the Z-value of the points in neighborhood. The encoder 510 then averages the X, Y, and Z values to generate the centroid. After deriving the centroid representing a geometry value of the neighboring points, the encoder 510 determines whether a difference between the centroid value and a geometry value of the query point is larger than a threshold. When the difference between the centroid value and a geometry value of the query point is less than the threshold, indicates that the query point is positioned near the neighboring points and as such no geometry smoothing is required. Alternatively, when the difference between the centroid value and a geometry value of the query point is larger than or equal to the threshold, indicates that the query point is offset and not near the neighboring points. The query point can be offset and not near the neighboring points, when the query point is from another patch. After determining that the difference is larger than the threshold, the encoder 510 modifies the geometry value of the query point. For example, the encoder 510 replaces the geometry value of the query point with the geometry value of the centroid.

In certain embodiments, when identifying the neighborhood around the query point, the encoder 510 also identifies a second area around the query point that is smaller than the neighborhood. The second area can be defined by a distance from the query point that is less than or equal to the size of the neighborhood. The encoder 510 then determines that one or more of the neighboring points are (i) within a second distance from the query point and (ii) positioned on the boundary of one of the patches. The encoder 510 determines whether a difference between the centroid and a geometry value of each of the neighboring points is (i) within the second area from the query point and (ii) positioned on the boundary of one of the patches is larger than a threshold. After determining that the difference is larger than the threshold, the encoder 510 modify the geometry value of each neighboring point that is (i) within the second distance from the query point and (ii) positioned on the boundary of one of the patches with the geometry value of the centroid.

In certain embodiments, when the smoothing is geometry, the encoder 510 can identify neighboring points of the query point. The encoder 510 then determines whether one of the neighboring points is also identified as a boundary point. Alternatively, the encoder 510 can determine whether one of the neighboring points is positioned on a boundary of one of the patches. When a neighboring point of the query point is a boundary point (either classified as a boundary point by being within a distance from the query point or positioned on the boundary of a patch), the encoder 510 derives a centroid representing the geometry value of all of the neighboring points. The encoder 510 then compares the centroid with each neighboring point that is identified as a boundary point, as well as the query point, since the query point was previously identified as a boundary point. The encoder 510 determines whether to modify each geometry value of any of the boundary points as well as the query point. The encoder 510 will modify each boundary point (including the query point), when the difference between the centroid and a respective geometry value is larger than a threshold. For example, if there are three points identified as a boundary point, including the query point, the encoder 510 compares the geometry value of each boundary point to the centroid. The encoder 510 modifies only the boundary points whose value when compared to the centroid is larger than a threshold. That is, the encoder 510 can modify, none, one, two or all three of the identified boundary points, based on the comparison.

In step 1010, the encoder 510 encodes the 2D frames. The encoder 510 can include the frames at different time instances. For example, the encoder can generate the frames representing geometry of the point cloud and then encode the geometry frames, prior to generating and encoding the frames that represent texture of the point cloud. After the frames representing geometry, the frames representing texture, and the occupancy map frames are encoded, the encoder 510 can multiplex the frames into a bitstream. In step 1012, the encoder 510 transmits the compressed bitstream. The compressed bitstream can be ultimately transmitted to a decoder, such as the decoder 550.

Although FIG. 10 illustrates one example of a method 1000 for encoding a point cloud, various changes may be made to FIG. 10. For example, while shown as a series of steps, various steps in FIG. 10 could overlap, occur in parallel, or occur any number of times.

Figure 11:
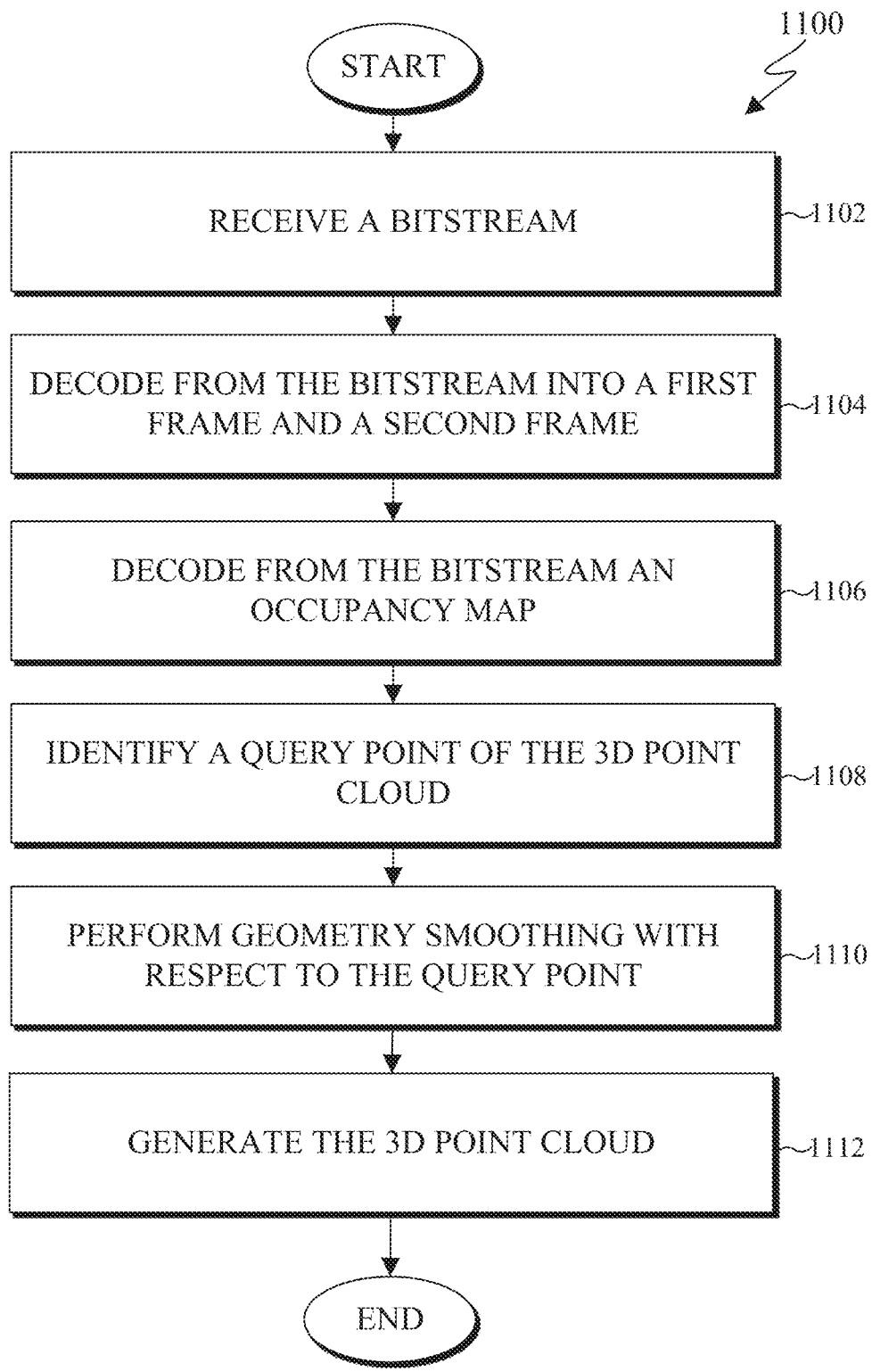
FIG. 11 illustrates an example method for decoding a point cloud in accordance with an embodiment of this disclosure.

FIG. 11 illustrates example method 1100 for decoding a point cloud in accordance with an embodiment of this disclosure. The method 1100 can be performed by the sever 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the method 1100 is described as being performed by the decoder 550 of FIGS. 5A and 5C.

The method 1100 begins with the decoder, such as decoder 550, receiving a compressed bitstream (step 1102). The received bitstream can include an encoded point cloud that was mapped onto multiple 2D frames, compressed, and then transmitted and ultimately received by the decoder 550.

In step 1104, the decoder 550 decodes the bitstream into a first frame, a second frame that represent a 3D point cloud. The first and second frames can represent different attributes of the 3D point cloud. For example, the first frame can represent geometry information of the points of the point cloud, while the second frame represents color information of the points of the point cloud. In certain embodiments, additional frames that represent other textures can be decoded. The first and second frames include patches representing respective clusters of points from the 3D point cloud. There is a correspondence (or a mapping) between the patches in a frame that includes geometry information and each additional texture frame. For example, if the pixel location (i, j) within a patch in the geometry frame stores the geometry information (such as depth) of the kth point in the point cloud, then the color of the kth point is stored at pixel location (i, j) the associated color frame. A correspondence exists between each additional frame representing a different texture.

In step 1106, the decoder 550 decodes an occupancy map from the bitstream. The occupancy map indicates pixels within a geometry frame, or a texture frame that correspond to the points of the 3D point cloud. For example, the occupancy map can indicate whether a pixel within the geometry frame is a valid pixel such that it corresponds to a valid point of the 3D point cloud or an invalid pixel such that the information stored for that pixel does not correspond to the 3D point cloud.

In step 1108, the decoder 550 identifies a query point. The query point is a point that is classified as a boundary point. The query point can be located on a boundary of a patch or a distance away from a boundary. The decoder 550 can identify the query point on one of the 2D frames. Alternatively, the decoder 550 can identify the query point as a point of the point cloud. For example, the decoder 550 can reconstruct the geometry of the 3D point cloud and based on correspondence information between a pixel on a 2D frame and a point of the 3D point, the decoder 550 can identify whether a particular query point is also a boundary point.

In step 1110, the decoder 550 performs smoothing to the query point. The decoder 550 can reconstruct the geometry of the point cloud from the frame that represents geometry information. The decoder 550 can identify neighboring points of the query point. The decoder 550 then derives a centroid representing a geometry value of the neighboring points. To derive the centroid representing a geometry value of the neighboring points the decoder 550 identifies the X-value the Y-value and the Z-value of the points in neighborhood. The decoder 550 then averages the X, Y, and Z values to generate the centroid.

After deriving the centroid representing a geometry value of the neighboring points, the decoder 550 determines whether a difference between the centroid value and a geometry value of the query point is larger than a threshold. When the difference between the centroid value and a geometry value of the query point is less than the threshold, indicates that the query point is positioned near the neighboring points and as such no geometry smoothing is required. Alternatively, when the difference between the centroid value and a geometry value of the query point is larger than or equal to the threshold, indicates that the query point is offset and not near the neighboring points. The query point can be offset and not near the neighboring points, when the query point is from another patch. After determining that the difference is larger than the threshold, the decoder 550 modifies the geometry value of the query point. For example, the decoder 550 replaces the geometry value of the query point with the geometry value of the centroid.

In certain embodiments, when identifying the neighborhood around the query point, the decoder 550 also identifies a second area around the query point that is smaller than the neighborhood. The second area can be defined by a distance from the query point that is less than or equal to the size of the neighborhood. The decoder 550 then determines that one or more of the neighboring points are (i) within a second distance from the query point and (ii) positioned on the boundary of one of the patches. The decoder 550 determines whether a difference between the centroid and a geometry value of each of the neighboring points is (i) within the second area from the query point and (ii) positioned on the boundary of one of the patches is larger than a threshold. After determining that the difference is larger than the threshold, the decoder 550 modify the geometry value of each neighboring point that is (i) within the second distance from the query point and (ii) positioned on the boundary of one of the patches with the geometry value of the centroid.

In step 1112, the decoder 550 generates the 3D point cloud. For example, after the geometry of certain points is smoothed, the decoder 550 applies each texture that is included in the bitstream, such as color, to the geometry points.

Although FIG. 11 illustrates one example of a method 1100 for decoding a point cloud, various changes may be made to FIG. 11. For example, while shown as a series of steps, various steps in FIG. 11 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An encoding device for point cloud encoding, the encoding device comprising:
a processor configured to:
generate, for a three-dimensional (3D) point cloud, a first frame representing a first attribute of the 3D point cloud, wherein the first frame includes patches representing clusters of points from the 3D point cloud,
generate an occupancy map frame indicating pixels from the first frame that correspond to the points of the 3D point cloud,
identify a query point of the 3D point cloud,
determine to classify the query point, which is a point of the 3D point cloud, as a boundary point, wherein the determination is based on whether a pixel in the first frame that represents the query point is within a predefined distance from a patch boundary,
in response to the query point being classified as the boundary point, perform smoothing with respect to the query point, wherein the smoothing modifies a second attribute of the query point in 3D space, wherein the second attribute represents color,
after the smoothing is performed, generate a second frame representing the modified second attribute of the 3D point cloud,
encode the first frame, the second frame, and the occupancy map frame, and
generate a compressed bitstream from the first frame, the second frame, and the occupancy map frame; and
a communication interface operably coupled to the processor, the communication interface configured to transmit the compressed bitstream.

2. The encoding device of claim 1, wherein:
the 3D point cloud is a first 3D point cloud;
the first attribute represents geometry; and
smoothing modifies the query point with respect to the second attribute.

3. The encoding device of claim 2, wherein the processor is further configured to:
before generating the second frame and after encoding the first frame, decode the first frame,
after decoding the first frame, generate a second 3D point cloud based on the first frame,
apply the second attribute to points of the second 3D point cloud,
perform smoothing on the query point, and
after the second attribute is smoothed, generate the second frame based on the second 3D point cloud.

4. The encoding device of claim 3, wherein:
to perform smoothing of the query point, the processor is configured to:
identify neighboring points within a distance from the query point,
derive a local entropy value of the neighboring points,
compare the local entropy value of the neighboring points to a first threshold,
when the local entropy value is smaller than the first threshold, derive a centroid representing color values of the neighboring points,
determine whether a difference between the centroid and a color value of the query point is larger than a second threshold, and
after determining that the difference is larger than the second threshold, modify the color value of the query point with the color value of the centroid; and
the processor is configured to not smooth the query point when:
the local entropy value is larger than the first threshold; or
the difference is smaller than the second threshold.

5. The encoding device of claim 4, wherein:
the local entropy value is based on:
luminance of the neighboring points, or
color components of the neighboring points; and
to derive the centroid, the processor is configured to:
identify red color values, green color values, and blue color values for each neighboring points of the query point, and
average the red color values, the green color values, and the blue color values to generate the centroid.

6. The encoding device of claim 1, wherein to identify the query point, the processor is configured to:
determine whether a first pixel at a first location within the occupancy map frame is set to a first value or a second value;
identify a second pixel at the first location in the first frame or the second frame;
when the first pixel is set to the first value, determine that the second pixel is not included in the 3D point cloud;
when the first pixel is set to the second value, determine that the second pixel represents the point that is included in the 3D point cloud;
after determining that the second pixel represents the point that is included in the 3D point cloud, determine whether a value assigned to a third pixel at a second location within the occupancy map frame is set to the first value or the second value, wherein the third pixel is adjacent to the first pixel; and
when the value assigned to the third pixel is set to the first value, classify the second pixel as a boundary pixel.

7. The encoding device of claim 1, wherein:
the first attribute represents geometry;
smoothing modifies the query point with respect to the first attribute; and
the processor is further configured to:
before generating the second frame and after encoding the first frame, decode the first frame,
after decoding the first frame, generate a second 3D point cloud based on the first frame,
apply the second attribute to points of the second 3D point cloud,
perform smoothing on the query point, and
after the second attribute is smoothed, generate the second frame based on the second 3D point cloud.

8. The encoding device of claim 7, wherein to perform smoothing of the query point, the processor is configured to:
identify neighboring points of the query point;
derive a centroid representing a geometry value of the neighboring points;
determine whether a difference between the centroid and a geometry value of the query point is larger than a threshold; and
after determining that the difference is larger than the threshold, modify the geometry value of the query point with the geometry value of the centroid.

9. The encoding device of claim 8, wherein the processor is configured to not smooth of the query point when the difference is smaller than the threshold.

10. The encoding device of claim 7, wherein to perform smoothing of the query point, the processor is configured to:
identify neighboring points of the query point;
determine that one or more of the neighboring points is represented by a pixel that is on a boundary of one of the patches;
derive a centroid representing a geometry value of the neighboring points;
determine whether a difference between the centroid and a geometry value of one of the neighboring points that is positioned on the boundary of one of the patches is larger than a threshold; and
after determining that the difference is larger than the threshold, modify the geometry value of the one neighboring point that is represented at the boundary of one of the patches with the geometry value of the centroid.

11. The encoding device of claim 10, wherein the processor is further configured to:
after modifying the geometry value of the one neighboring point that is positioned on the boundary of one of the patches, exclude the one neighboring point from further smoothing.

12. The encoding device of claim 7, wherein to perform smoothing of the query point, the processor is configured to:
identify neighboring points of the query point, wherein the neighboring points include points that are within a first distance from the query point;
determine that one or more of the neighboring points are (i) within a second distance from the query point and (ii) positioned on a boundary of one of the patches, the first distance is larger than the second distance;
derive a centroid representing a geometry value of the neighboring points;
determine whether a difference between the centroid and a geometry value of one of the neighboring points that is (i) within the second distance from the query point and (ii) positioned on the boundary of one of the patches is larger than a threshold;
after determining that the difference is larger than the threshold, modify the geometry value of the one neighboring point that is (i) within the second distance from the query point and (ii) positioned on the boundary of one of the patches with the geometry value of the centroid; and
after modifying the geometry value of the one neighboring point that is (i) within the second distance from the query point and (ii) positioned on the boundary of one of the patches, exclude the one neighboring point from further smoothing.

13. The encoding device of claim 1, wherein:
the first attribute represents geometry;
smoothing modifies the query point with respect to the first attribute; and
the processor is further configured to:
identify a set of patches in the first frame that are adjacent in 3D space,
identify neighboring points of the query point, wherein the query point is within one of the set of patches,
project the neighboring points on a projection plane of the query point,
derive an average depth value of the neighboring points,
determine whether a difference between the average depth value of the neighboring points and an average depth value of the query point is larger than a threshold, and
when the difference is larger than the threshold, modify the average depth value of the query point with the average depth value of the neighboring points.

14. A decoding device for point cloud decoding, the decoding device comprising:
a communication interface configured to receive a bitstream; and
a processor operably coupled to the communication interface, wherein the processor is configured to:

decode the bitstream into a first frame representing a first attribute of a three-dimensional (3D) point cloud and a second frame representing a second attribute of the 3D point cloud that was previously smoothed, wherein the first frame and the second frame include patches representing respective clusters of points from the 3D point cloud, decode an occupancy map frame indicating pixels, from the first and second frames, that correspond to the points of the 3D point cloud, reconstruct the 3D point cloud using (i) the occupancy map frame and (ii) the first frame representing geometric positions of the points of the 3D point cloud, after the geometric positions of the points of the 3D point cloud is reconstructed, identify a query point, determine to classify the query point, which is a point of the 3D point cloud, as a boundary point, wherein the determination is based on whether a pixel in the first frame that represents the query point is within a predefined distance from a patch boundary, in response to the query point being classified as the boundary point, perform geometry smoothing with respect to the query point, wherein the smoothing modifies the first attribute of the query point in 3D space, and after performing the geometry smoothing, generate the 3D point cloud.

15. The decoding device of claim 14, wherein to identify the query point, the processor is configured to:
determine whether a first pixel at a first location within the occupancy map frame is set to a first value or a second value;
identify a second pixel at the first location in the first frame or the second frame;
when the first pixel is set to the first value, determine that the second pixel is not included in the 3D point cloud;
when the first pixel is set to the second value, determine that the second pixel represents the point that is included in the 3D point cloud;
after determining that the second pixel represents the point that is included in the 3D point cloud, determine whether a value assigned to a third pixel at a second location within the occupancy map frame is set to the first value or the second value, wherein the third pixel is adjacent to the first pixel; and
when the value assigned to the third pixel is set to the first value, classify the second pixel as a boundary pixel.

16. The decoding device of claim 14, wherein:
the first attribute represents geometry information of the 3D point cloud, and
the second attribute represents color information of the 3D point cloud.

17. The decoding device of claim 16, wherein to perform smoothing of the query point, the processor is configured to:
identify neighboring points of the query point;
derive a centroid representing a geometry value of the neighboring points;
determine whether a difference between the centroid and a geometry value of the query point is larger than a threshold; and
after determining that the difference is larger than the threshold, modify the geometry value of the query point with the geometry value of the centroid.

18. The decoding device of claim 16, wherein to perform geometry smoothing of the query point, the processor is configured to:
identify neighboring points of the query point;
determine that one or more of the neighboring points is represented by a pixel that is on a boundary of one of the patches;
derive a centroid representing a geometry value of the neighboring points;
determine whether a difference between the centroid and a geometry value of one of the neighboring points that is positioned on the boundary of one of the patches is larger than a threshold;
after determining that the difference is larger than the threshold, modify the geometry value of the one neighboring point that is represented at the boundary of one of the patches with the geometry value of the centroid; and
after modifying the geometry value of the one neighboring point that is positioned on the boundary of one of the patches, exclude the one neighboring point from further smoothing.

19. The decoding device of claim 16, wherein to perform geometry smoothing of the query point, the processor is configured to:
identify neighboring points of the query point, wherein the neighboring points include points that are within a first distance from the query point;
determine that one or more of the neighboring points are (i) within a second distance from the query point and (ii) positioned on a boundary of one of the patches, the first distance is larger than the second distance;
derive a centroid representing a geometry value of the neighboring points;
determine whether a difference between the centroid and a geometry value of one of the neighboring points that is (i) within the second distance from the query point and (ii) positioned on the boundary of one of the patches is larger than a threshold; and
after determining that the difference is larger than the threshold, modify the geometry value of the one neighboring point that is (i) within the second distance from the query point and (ii) positioned on the boundary of one of the patches with the geometry value of the centroid.

20. The decoding device of claim 16, wherein the processor is further configured to:
identify a set of patches in the first frame that are adjacent in 3D space;
identify neighboring points of the query point, wherein the query point is within one of the set of patches;
project the neighboring points on a projection plane of the query point;
derive an average depth value of the neighboring points;
determine whether a difference between the average depth value of the neighboring points and an average depth value of the query point is larger than a threshold; and
when the difference is larger than the threshold, modify the average depth value of the query point with the average depth value of the neighboring points.

* * * * *